United States Patent
Li et al.

(10) Patent No.: US 12,190,637 B2
(45) Date of Patent: Jan. 7, 2025

(54) APPLYING A CONTINUOUS EFFECT VIA MODEL-ESTIMATED CLASS EMBEDDINGS

(71) Applicant: L'Oreal, Paris (FR)

(72) Inventors: Zeqi Li, Toronto (CA); Ruowei Jiang, Toronto (CA); Parham Aarabi, Richmond Hill (CA)

(73) Assignee: L'Oreal, Paris (FR)

( * ) Notice: Subject to any disclaimer, the term of this patent is extended or adjusted under 35 U.S.C. 154(b) by 428 days.

(21) Appl. No.: 17/558,955

(22) Filed: Dec. 22, 2021

(65) Prior Publication Data

US 2022/0198830 A1 Jun. 23, 2022

Related U.S. Application Data

(60) Provisional application No. 63/129,794, filed on Dec. 23, 2020.

(30) Foreign Application Priority Data

May 25, 2021 (FR) ...................................... 2105404

(51) Int. Cl.
*G06T 11/00* (2006.01)
*G06N 3/08* (2023.01)
(Continued)

(52) U.S. Cl.
CPC ....... *G06V 40/178* (2022.01); *G06Q 30/0631* (2013.01); *G06T 11/00* (2013.01);
(Continued)

(58) Field of Classification Search
CPC ............. G06V 40/178; G06V 10/7715; G06V 40/168; G06Q 30/0631; G06T 11/00;
(Continued)

(56) References Cited

U.S. PATENT DOCUMENTS

| 2004/0122299 A1 | 6/2004 | Nakata |
| 2011/0116691 A1 | 5/2011 | Chung et al. |

(Continued)

FOREIGN PATENT DOCUMENTS

| EP | 1 813 189 A1 | 8/2007 |
| WO | WO 2018/222808 A1 | 12/2018 |

OTHER PUBLICATIONS

International Search Report issued Apr. 14, 2022 in PCT/EP2021/087150, 18 pages.

(Continued)

*Primary Examiner* — Juan M Guillermety
(74) *Attorney, Agent, or Firm* — Oblon, McClelland, Maier & Neustadt, L.L.P.

(57) ABSTRACT

There is provided methods, devices and techniques to process an image using a deep learning model to achieve continuous effect simulation by a unified network where a simple (effect class) estimator is embedded into a regular encoder-decoder architecture. The estimator allows learning of model-estimated class embeddings of all effect classes (e.g. progressive degrees of the effect), thus representing the continuous effect information without manual efforts in selecting proper anchor effect groups. In an embodiment, given a target age class, there is derived a personalized age embedding which considers two aspects of face aging: 1) a personalized residual age embedding at a model-estimated age of the subject, preserving the subject's aging information; and 2) exemplar-face aging basis at the target age, encoding the shared aging patterns among the entire population. Training and runtime (inference time) embodiments are described including an AR application that generates recommendations and provides ecommerce services.

21 Claims, 12 Drawing Sheets

(51) Int. Cl.
    *G06Q 30/0601* (2023.01)
    *G06V 10/77* (2022.01)
    *G06V 40/16* (2022.01)
(52) U.S. Cl.
    CPC ........ *G06V 10/7715* (2022.01); *G06V 40/168* (2022.01); *G06N 3/08* (2013.01); *G06T 2207/20081* (2013.01); *G06T 2207/20084* (2013.01); *G06T 2207/30201* (2013.01)
(58) Field of Classification Search
    CPC . G06T 2207/20081; G06T 2207/20084; G06T 2207/30201; G06N 3/08; G06F 18/24133
    See application file for complete search history.

(56) References Cited

U.S. PATENT DOCUMENTS

| | | | |
|---|---|---|---|
| 2017/0270593 A1* | 9/2017 | Sherman | G06V 40/168 |
| 2018/0350071 A1 | 12/2018 | Purwar et al. | |
| 2019/0244108 A1* | 8/2019 | Meyerson | G06N 3/082 |
| 2020/0349711 A1* | 11/2020 | Duke | G06T 11/001 |

OTHER PUBLICATIONS

Yang Hongyu, et al., "Learning Continuous Face Age Progression. A Pyramid of GANs", IEEE Transactions on Pattern Analysis and Machine Intelligence, IEEE Computer society, USA, vol. 42, No. 2, Jul. 26, 2019 (Jul. 25, 2019), Feb. 2021, pp. 499-515. XP011830056, [retrieved on Jan. 7, 2021].
Zeoi Li, et al., "Continuous Face Aging via Self-estimated Residual Age Embedding", ARXIV.org, Cornell University Library, 201 Olin Library Cornell University Ithica, NY 14853, Apr. 30, 2021 (Apr. 30, 2021), XP081946655, 1-14 pages.
Jagtap. J., et al., "Human age classification using facial skin aging features and artificial neural network" Science Direct, Cognitive Systems Research, vol. 40 (2016), pp. 118-128.
French Preliminary Search Report issued Feb. 8, 2022 in French Patent Application No. 2105404, 9 pages.
Grigory Antipov, et al., "Face Aging with Conditional Generative Adversarial Networks", May 30, 2017.
Yosuke Bando, et al., "A Simple Method for Modeling Wrinkles on Human Skin", Feb. 2002.
Laurence Boissieux, et al., "Simulation of Skin Aging and Wrinkles with Cosmetics Insight", Jan. 2000.
D. Michael Burt, et al., "Perception of age in adult Caucasian male faces: computer graphic manipulation of shape and colour information", Dec. 12, 1994.
Bor-Chun Chen et al., "Cross-Age Reference Coding for Age-Invariant Face Recognition and Retrieval", Sep. 6, 2014.
Yunjey Choi, et al., "StarGAN: Unified Generative Adversarial Networks for Multi-Domain Image-to-Image Translation", Sep. 21, 2018.
Yunjey Choi et al., "StarGAN v2: Diverse Image Synthesis for Multiple Domains", Apr. 26, 2020.
Harm de Vries, et al., "Modulating early visual processing by language", Dec. 18, 2017.
Ian J. Goodfellow et al., "Generative Adversarial Nets", Jun. 10, 2014.
Zhenliang He et al., "S² GAN: Share Aging Factors Across Ages and Share Aging Trends Among Individuals", Oct. 1, 2019.
Zhenliang He et al., "AttGAN: Facial Attribute Editing by Only Changing What You Want", Jul. 25, 2018.
Martin Heusel et al., "GANs Trained by a Two Time-Scale Update Rule Converge to a Local Nash Equilibrium", Jan. 12, 2018.
Xun Huang et al., "Arbitrary Style Transfer in Real-time with Adaptive Instance Normalization", Jul. 30, 2017.
Phillip Isola et al., "Image-to-Image Translation with Conditional Adversarial Networks", Nov. 26, 2018.
Tero Karras Nvidia, et al., "A Style-Based Generator Architecture for Generative Adversarial Networks", Mar. 29, 2019.
Ira Kemelmacher-Shlizerman et al., "Illumination-Aware Age Progression", Sep. 25, 2014.
Andreas Lanitis et al., "Toward Automatic Simulation of Aging Effects on Face Images", IEEE Transactions on Pattern Analysis and Machine Intelligence, vol. 24, No. 4, Apr. 2002.
Peipei Li et al., "Global and Local Consistent Age Generative Adversarial Networks", Jan. 25, 2018.
Ming Liu et al., "STGAN: A Unified Selective Transfer Network for Arbitrary Image Attribute Editing", Apr. 22, 2019.
Si Liu et al., "Face Aging with Contextual Generative Adversarial Nets", Feb. 1, 2018.
Yunfan Liu et al., "Attribute-aware Face Aging with Wavelet-based Generative Adversarial Networks", Apr. 15, 2019.
Mehdi Mirza et al., "Conditional Generative Adversarial Nets", Nov. 6, 2014.
Augustus Odena et al., "Conditional Image Synthesis with Auxiliary Classifier GANs", Jul. 20, 2017.
Roy Or-El et al., "Lifespan Age Transformation Synthesis", Jul. 24, 2020.
Hongyu Pan et al., "Mean-Variance Loss for Deep Age Estimation from a Face", Dec. 17, 2018.
Taesung Park et al., "Semantic Image Synthesis with Spatially-Adaptive Normalization", Nov. 5, 2019.
Narayanan Ramanathan et al., "Modeling Age Progression in Young Faces", Jun. 17, 2006.
Rama Chellappa et al., "Modeling shape and textural variations in aging faces", Oct. 2008.
Karl Ricanek et al., "MORPH: A longitudinal image database of normal adult age-progression", May 2006.
Rasmus Rothe et al., "Deep Expectation of Real and Apparent Age from a Single Image Without Facial Landmarks", Received: Feb. 15, 2016/Accepted: Jul. 20, 2016, Springer Science + Business Media, New York 2016.
Duncan A. Rowland et al., "Manipulating Facial Appearance through Shape and Color", IEEE vol. 15, No. 5: Sep. 1995.
Yujun Shen et al., "Interpreting the Latent Space of GANs for Semantic Face Editing", Mar. 31, 2020.
Xiangbo Shu et al., "Personalized Age Progression with Aging Dictionary", Feb. 18, 2016.
Jinli Suo et al., "A Concatenational Graph Evolution Aging Model", IEEE Transactions on Pattern Analysis and Machine Intelligence, vol. 34, No. 11, Nov. 2012.
Jinli Suo et al., "A Multi-Resolution Dynamic Model for Face Aging Simulation", Jul. 16, 2007.
Jinli Suo et al., "A Compositional and Dynamic Model for Face Aging", Feb. 13, 2009.
Bernard Tiddeman, et al., "Prototyping and Transforming Facial Textures for Perception Research", IEEE Computer Graphics and Applications, vol. 21, Issue 5, Sep./Oct. 2001.
Wei Wang et al., "Recurrent Face Aging", Dec. 12, 2016.
Wei Wang et al., "Category Specific Dictionary Learning for Attribute Specific Feature Selection", IEEE Transactions on Image Processing, vol. 25, No. 3, Mar. 2016.
Zongwei Wang et al., "Face Aging with Identity-Preserved Conditional Generative Adversarial Networks", Dec. 17, 2018.
Yin Wu et al., "A Plastic-Visco-Elastic Model for Wrinkles in Facial Animation and Skin Aging", May 2002.
Hongyu Yang et al., "Learning Face Age Progression: A Pyramid Architecture of GANs", Dec. 17, 2018.
Hongyu Yang et al., "Face Aging Effect Simulation using Hidden Factor Analysis Joint Sparse Representation", Nov. 4, 2015.
Xu Yao et al., "High Resolution Face Age Editinig", May 9, 2020.
Zhifei Zhang et al., "Age Progression/Regression by Conditional Adversarial Autoencoder", Mar. 28, 2017.
Jun-Yan Zhu et al., "Unpaired Image-to-Image Translation using Cycle-Consistent Adversarial Networks", Aug. 24, 2020.

* cited by examiner

APPLYING A CONTINUOUS EFFECT VIA MODEL-ESTIMATED CLASS EMBEDDINGS

CROSS-REFERENCE TO RELATED APPLICATIONS

This application claims the benefit of priority from U.S. Provisional Application No. 63/129,794 filed Dec. 23, 2020, and claims the benefit of priority from French Application No. FR 2105404 filed May 25, 2021, the entire contents of each of which are incorporated herein by reference.

FIELD

This application relates to image processing and to image processing to generate an updated image using neural network technology to continuously apply an effect such as aging a facial image.

BACKGROUND

Face aging, also known as age progression, aims to aesthetically render input face images with natural aging or rejuvenating effects while preserving identity information of the individual. With recent advances in deep learning, face synthesis has also shown substantial improvement on image fidelity and the age precision in the simulated face images [10, 41, 24]. A major challenge to solve a variety of remaining problems (e.g. continuous aging) is the lack of data. For example, many research works of face aging [20, 41, 43, 10] need to group images into 4-5 age groups (such as <30, 30-40, 40-50, 50+) and can only generate images within a target age group, due to the limited amount of data at each age. Another important problem is how to maintain personal traits in age progression, as aging patterns may differ for each individual.

Traditional face aging contains mainly two approaches: physical model-based [3, 42] and prototype-based [37, 16]. The physical model-based methods often consist of complex physical modeling, considering skin wrinkles, face shape, muscle changes, and hair color, etc. This type of method typically requires a tremendous amount of data and is very expensive computationally. Prototype-based methods firstly explore group-based designs by computing an average face within the pre-defined age groups, which fails to retain personalized aging information. Further, all those methods are not applicable to continuous face aging.

Following the success of recent generative models, such as variational autoencoders (VAEs) and generative adversarial networks (GANs) [9], on the image translation tasks, researchers have dedicated efforts in adapting those methods to face synthesis. IPCGAN [41] has shown significant progress in generating face images with evident aging effects by enforcing an age estimation loss. Later variation [43] creates a pyramid structure for the discriminator to improve face aging understanding at multiple scales. Continuous aging was not explored among these methods. He et al. [10] introduced a multi-branch generator for the group-based training and proposed the idea to approximate continuous aging via linear interpolation of latent representations between two adjacent age groups. The authors of [24] also tackle the problem using a similar linear interpolation approach, which is performed on the learned age latent code between two neighboring groups instead. These types of methods make an assumption that the age progression is linear between the two adjacent groups and the learned group embedding can be used directly as the median age embedding. Consequently, this may result in a shift of target age in the generated images. Intuitively, this nonlinearity can be interpreted as: people do not age at the same speed for different stages. Moreover, such interpolation-based methods may alter personal traits when disentanglement is imperfect.

SUMMARY

To address the aforementioned problems, there is proposed a novel approach to achieve application of a continuous face effect such as aging by a unified network where a simple class estimator (e.g. an age estimator for an aging effect, a smile progression (a class) for a continuous smile effect, etc.) is embedded into a regular encoder-decoder architecture. This allows the network to learn model-estimated class (e.g. age, smile, etc.) embeddings of all progressive stages or classes (e.g. ages, degrees of smile, etc.), thus representing the continuous effect information without manual efforts in selecting proper anchor progressive stage (e.g. age, smile degree, etc.) groups. In the age example, given a target age (the target age being one of the classes in the continuous effect), there is derived a personalized age embedding which considers two aspects of face aging: 1) a personalized residual age embedding at the current age of the subject in the image, which preserves the individual's aging information; and 2) exemplar-face aging basis at the target age, which encodes the shared aging patterns among the entire population. There is described the detailed calculation and training mechanism. The calculated target age embedding is then used for final image generation. Experiments on FFHQ [15] and CACD2000 [5] datasets are detailed. The results, both qualitatively and quantitatively, show significant improvement over the state-of-the-art in various aspects.

In the age context, embodiments include a novel method to self-estimate (e.g. where "self" references estimations by the model (e.g. a model-estimate)) continuous age embeddings and derive personalized age embeddings for a face aging task by jointly training an age estimator with the generator. Experiments and analysis quantitatively and qualitatively demonstrate that the generated images better preserve the personalized information, achieve more accurate aging control, and present more fine-grained aging details. The continuous aging approach in accordance with an embodiment herein generates images with more well-aligned target ages, and better preserves detailed personal traits, without manual efforts to define proper age groups.

The proposed techniques and methods, etc. to model-estimate personalized age embedding from a related discriminative model can be easily applied to other conditional image-to-image translation tasks, without introducing extra complexity. In particular, tasks involving a continuous condition and modeling (e.g. non-smile to smile, etc.), can benefit from this setup.

In an embodiment there is provided, a method comprising: providing a unified age simulation model to generate, from an input image of a subject, a new image at a target age for the subject; and using the model to generate the new image; wherein the unified age simulation model provides a plurality of respective model-estimated age embeddings at each of a plurality of continuous ages representing continuous aging information, the model-estimated age embeddings learned through joint training of a generator and an age estimator embedded into an encoder-decoder architecture of the model, the age estimator configured to determine model-estimated ages of subjects from respective encoder generated features responsive to respective input images; and wherein the generator generates the new image using the encoder generated features from the input image as transformed by respective ones of the model-estimated age embeddings determined in accordance with the target age and a model-estimated age of the subject.

In an embodiment, the encoder-decoder architecture comprises the age estimator to estimate a model-estimated age of the subject in the input image.

In an embodiment, an encoder of the model processes the input image to determine the encoder generated features and wherein the age estimator processes the encoder generated features to determine the model-estimated age.

In an embodiment, the encoder generated features are transformed by personalized age embeddings comprising: respective ones of the model-estimated age embeddings determined in accordance with the model-estimated age; and the respective ones of the model-estimated age embeddings determined in accordance with the target age. In an embodiment, the personalized age embeddings comprise: personalized residual age embeddings determined from the plurality of respective model-estimated age embeddings in response to the model-estimated age to preserve identity information of the subject; and exemplary age embeddings comprising the respective ones of the model-estimated age embeddings determined in accordance with the target age to represent shared aging patterns among an entire population.

In an embodiment, the personalized age embeddings are applied in accordance with an affine transformation.

In an embodiment, the generator processes the encoded features as transformed by the personalized age embedding to generate the new image at the target age.

In an embodiment, the model is one or both of a deep learning neural network model and a generative adversarial network-based model.

In an embodiment, the method comprises providing a recommendation interface to obtain a recommendation for one or both of a product and a service.

In an embodiment, the method comprises providing an ecommerce purchase interface to purchase one or both of products and services.

In an embodiment, the method comprises receiving the input image and providing the new image for display.

In an embodiment, the new image comprise a face of the subject.

In accordance with an embodiment, there is provided a method comprising: providing a unified model to generate, from an input image of a subject, a new image at a target class of a continuous effect for the subject; and using the model to generate the new image; wherein the model provides a plurality of respective model-estimated class embeddings at each of a plurality of continuous target ranges representing continuous effect information, the model-estimated class embeddings learned through joint training of a generator and an effect estimator embedded into an encoder-decoder architecture of the model, the effect estimator configured to determine model-estimated classes of respective subjects from respective encoder generated features responsive to respective input images; and wherein the generator generates the new image using the encoder generated features from the input image as transformed by respective ones of the model-estimated class embeddings determined in accordance with the target class and a model-estimated class of the subject.

In accordance with an embodiment, there is provided a method comprising: providing a domain transfer model to transfer an input image to a new image, applying a continuous effect in a continuous manner to transform the input image to a target class of a plurality of continuous classes of the continuous effect using a plurality of respective model-estimated class embeddings learned by the model for each of the continuous classes of the continuous effect; and transferring the input image to the new image using the domain transfer model. In accordance with an embodiment, the continuous effect is an aging effect and the target class is a target age. In accordance with an embodiment, when transferring the input image, the domain transfer model operates to: a) produce encoded features of the input image; b) transform the encoded features using: personalized residual age embeddings determined from the plurality of respective model-estimated class embeddings in response to a model-estimated age of a subject in the input image to preserve identity information of the subject; and exemplary age embeddings comprising respective ones of the model-estimated class embeddings determined in accordance with the target age to represent shared aging patterns among an entire population; and c) generate the new image using the encoded features as transformed. In accordance with an embodiment, the model comprises an age estimator to determine the model-estimated age. In accordance with an embodiment, the age estimator comprises a classifier trained together with an encoder (of the model), the encoder configured for producing the encoded features, wherein the age estimator trained to determine respective model-estimated ages of subjects in new images using respective encoded features encoded by the encoder. In accordance with an embodiment, the model estimated class embeddings are defined during the training of the age estimator together with the encoder, associating respective ones of the model estimated class embeddings with the respective model-estimated ages.

In accordance with an embodiment, the method comprises providing a recommendation for at least one of a product and a service associated with the continuous effect. In accordance with an embodiment, the recommendation is generated in response to one or both of a skin analysis of the input image, and a user input of preferences. In accordance with an embodiment, the target age is determined in response to the recommendation. In accordance with an embodiment, the computing device is configured to communicate with an ecommerce service for the recommendation. In accordance with an embodiment, the computing device is configured to provide an annotated image generated from the input image to present the recommendation. In accordance with an embodiment, the method provides an ecommerce interface to purchase products, services or both. In accordance with an embodiment, the method comprises receiving the input image from a camera. In accordance with an embodiment, the continuous effect is an aging effect, the product comprises one of a rejuvenation product, an anti-aging product, and a cosmetic make-up product; and the service comprises one of a rejuvenation service, an anti-aging service, and a cosmetic service.

In accordance with an embodiment, there is provided a computing device comprising a processing unit and as storage device coupled thereto, the storage unit storing instructions which when executed by the processing unit configures the computing device to perform a method in accordance with any one of the method embodiments.

In accordance with an embodiment, there is provided a computer program product comprising a non-transient storage device storing instructions which when executed by a processing unit of a computing device configures the computing device to perform a method in accordance with any one of the method embodiments.

In accordance with an embodiment, there is provided a computing device comprising a processing unit and a storage device coupled thereto, the storage unit storing instructions which when executed by the processing unit configures the computing device to: provide a recommendation for at least one of a product and a service; and provide an age simulation image comprising a new image generated from an input image and a target age wherein the new image is generated in accordance with any one of the method embodiments.

DETAILED DESCRIPTION

Figure 1:
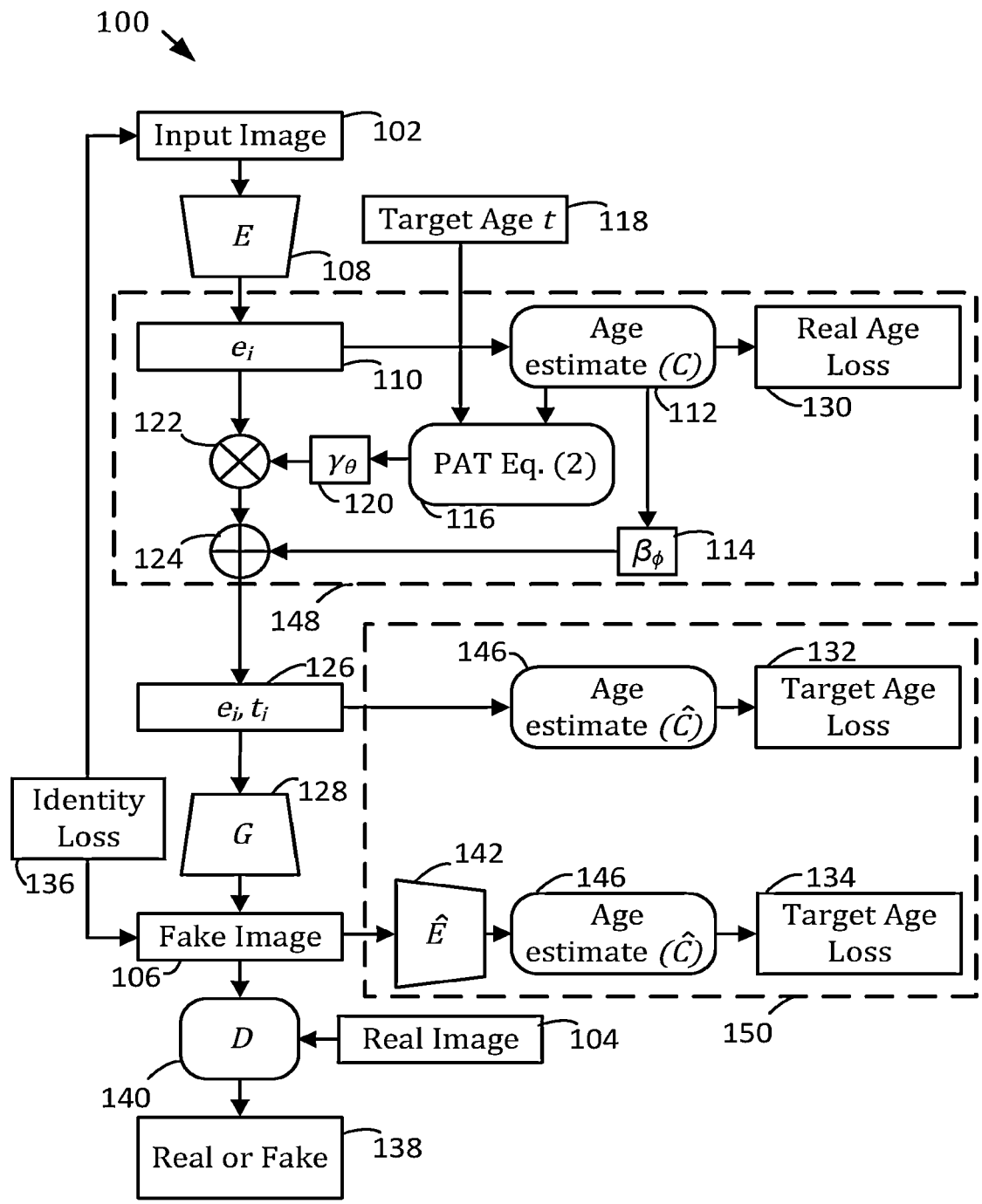
FIG. 1 is a block diagram of a model architecture in accordance with an embodiment herein showing a training configuration.

Face synthesis, including face aging, in particular, has been one of the major topics that witnessed a substantial improvement in image fidelity by using generative adversarial networks (GANs). Most existing face aging approaches divide the dataset into several age groups and leverage group-based training strategies, which lacks the ability to provide fine-controlled continuous aging synthesis in nature. In an embodiment there is provided a unified network structure that embeds a linear age estimator into a GAN-based model, where the embedded age estimator is trained jointly with the encoder and decoder to estimate the age of a face image and provide a personalized target age embedding for age progression/regression. The personalized target age embedding is synthesized by incorporating both personalized residual age embedding of the current age and exemplar-face aging basis of the target age, where all preceding aging bases are derived from the learned weights of the linear age estimator. This formulation brings the unified perspective of estimating the age and generating personalized aged face, where model-estimated age embeddings can be learned for every single age. The qualitative and quantitative evaluations on different datasets further demonstrate the significant improvement in the continuous face aging aspect over the state-of-the-art.

Related Work

Face Aging Model

Traditional methods can be categorized as physical model-based approaches [3, 42, 34] and prototype-based approaches [31, 37, 16, 17]. The physical model-based methods focuses on creating models to address specific sub-effects of aging, such as skin wrinkles [42, 2, 3], craniofacial growth [38, 27], muscle structure [34, 28], and face components [35, 36]. These methods are often very complicated, which typically require a sequence of face images of the same person at different ages and expert knowledge of the aging mechanism. The prototype-based approaches [31, 37, 4] explore face progression problem using group-based learning where an average face is estimated within each age group. However, personalized aging patterns and identity information are not well-preserved in such strategies. In [40, 44, 33], sparse representation of the input image have been utilized to express personalized face transformation patterns. Though the personalized aging patterns are preserved to some extent by such approaches, the synthesized images suffer from quality issues.

Recently, deep learning approaches have been adopted to model personalized aging transformations. Wang et al. [39] proposed a recurrent neural network model, leveraging a series of recurrent forward passes for a more smooth transition from young to old. Later GAN-based works [18, 41, 43] have shown superior breakthroughs on the fidelity of images. Li et al. [18] designed three subnets for local patches and fused local and global features to obtain a smooth synthesized image. IPCGAN [41] enforces an age estimation loss on the generated image and an identity loss to achieve good face aging effects. More efforts have also been made to address age accuracy and identity permanence. Yang et al. [43] and Liu et al. [20] introduce a modification of discriminator losses to guide a more accurate age of the output images. Authors of [21] improved image quality of synthesized images by using a wavelet packet transformation and multiple facial attribute encoding. However, these methods [41, 43, 20] condition the output image by concatenating one-hot vector representing the target age groups. To obtain a continuous aging condition, the vector will be extended to a much larger dimension, which makes training unstable and more complicated. Furthermore, it requires a tremendous amount of training images.

Though some works [46, 1, 32], which aim to interpolate features in the latent space, provided a direction to support continuous aging, they have limited ability to produce high-quality images while preserving the identity. In [10], the authors proposed to linear interpolate feature vectors from adjacent age groups upon group-based training to achieve continuous aging progression. Similarly, [24] linearly interpolates between two adjacent anchor age embeddings. These methods follow the assumption that the embeddings are aligned linearly between anchors, which makes the decision of anchor ages crucial. In this work, there is presented continuous model-estimated age embeddings free of manual efforts while achieving better continuous aging modeling.

Generative Adversarial Networks

Generative adversarial networks [9] have been a popular choice on image-to-image translations tasks. CycleGAN [47] and Pix2Pix [14] explored image translations between two domains using unpaired and paired training samples respectively. More recent works [6, 19] proposed training techniques to enable multi-domain translation. In [22, 23], authors firstly explored conditional image generation as extensions to basic GANs. Later works [7, 26] have further shown superiority on many conditional image translation tasks, by transforming and injecting the condition into the model in a more effective manner.

Face Age Estimation

The task to predict apparent age refers to the regression problem that estimates a continuous numerical value for each given face image. Deep Expectation of Apparent Age (DEX) [30] proposed a method to achieve a mean absolute error (MAE) of 3.25 on MORPH II [29], by combining classification loss and regression loss. Pan et al. [25] proposed to use mean-variance loss on the probability distribution to further improve the MAE to 2.16 on MORPH II.

Model Architecture Embodiments

FIG. 1 is an illustration of a model architecture 100 according to an embodiment. Model 100 is illustrated in a training configuration. In the embodiment, an input image 102 and a real image 104 are received for processing and a fake image 106 is generated. The input image comprises an image of a subject at a real age or current age, which may be any age. The age relates to the age of the subject in the image and not the age of the image itself. The real image 104 comprises an image of another subject at a target age (e.g. the image is a real image representing features of a target domain (a particular age)). The target age may be any age relative to the real age/current age, including the same age.

In the embodiment, an age estimator is jointly trained with an image generator, where E (e.g. 108) is the shared encoder producing features ($e_i$) 110 and C (e.g. 112) is branched off for the age estimation task. C produces output $\beta_\theta$ 114, an age probability distribution over a plurality of age classes. A personalized age embedding transformation (PAT, Eq. (2) 116) is based on two components: 1) residual aging basis at the current age (e.g. the model-estimated age as determined by C); and 2) exemplar face aging basis at the target age 118 (e.g. target age is received as an input). PAT produces output $\gamma_\varphi$ 120. In an embodiment the target age is a specific absolute age (e.g. "29" representing 29 years old). In an embodiment the target age is a delta age or age difference (e.g. a positive or negative integer (e.g. "−5") relative to a current age in the image or other baseline age.

In the embodiment, via an affine projection transformation of features 110, by operations 122 and 124 respectively using output 120 and 114 (see Eq. (3)), a transformed identity encoding ($e_i$, $t_i$) (e.g. 126) is produced for decoding by G (e.g. at 128) to produce fake image 106 (output).

The whole model (100) is trained with the age losses (e.g. 130, 132 and 134), identity loss 136), and the adversarial loss 138 from via discriminator D (140). A second encoder Ê 142 and a second age estimator Ĉ 146 are used (e.g. in a training configuration of model 100) as described further below.

FIG. 1 shows a first grouping 148 and a second grouping 150, in respective even length dashed line boxes. First grouping 148 highlights the encoder components in accordance with an embodiment, and second grouping 150 highlights decoder or generator side components useful in a training environment and which components are not involved in backpropagation during training.

As shown in FIG. 1, in accordance with an embodiment, the model comprises four components: identity encoding module E 108; 2) age estimation module C 112; 3) personalized age embedding transformation module PAT 116; and 4) aged face generation module G 128. The encoder network E is applied to extract the identity information from the given input image $x_i$, 102, where the encoding 110 is denoted as $e_i = E(x_i)$. Then an embedded age estimator C is used to obtain the age probability distribution 114 of the identity encoding 110. Based on the model-estimated age distribution and the target age t 118, there is applied a personalized age embedding transformation PAT on the identity encoding $e_i$. Lastly, the synthesized face (fake image 106) is decoded from the transformed identity encoding PAT($e_i$; t) (e.g. 126 by the generator G, 128.

All modules are optimized jointly end-to-end under three objectives in accordance with an embodiment including the mean-variance age loss [25] (130, 132 and 134) for accurate aging, the L1 reconstruction loss 136 for identity preservation, and the adversarial loss 138 for image realism.

Unlike many prior face aging works [41, 10] which require a pre-trained age classifier to guide the face aging training, model 100 directly obtains a model-estimated age embedding by utilizing a unified framework for achieving face aging and age estimation at the same time. More favorably, the embedded age estimator 112 not only enables personalized continuous age transformation in a more accurate manner, compared to an interpolation-based approach, but also provides the guidance for face image generation (e.g. at G 128).

Formulation

Identity Age Estimation Module (C): In prior works [41, 10], face aging and face age estimation are treated as two independent tasks where an age estimation model, usually a classifier, is pre-trained separately and then used to guide the generator to realize natural aging effects. In accordance with an embodiment herein, as the two mentioned tasks are intrinsically related, both goals can be achieved with one unified structure by sharing an encoder E.

The age estimator C 112, which in an embodiment of model 100, contains a global average pooling layer and a fully-connected layer, is branched off from E 108. Finally, the age probability distribution $p_i \in R^K$ (e.g. of $\beta_\theta$ 114) can be obtained by performing the softmax function, where K denotes the number of age classes. In an embodiment K=100. The parameter $m_i$ is determined from the distribution $p_i$.

A unified design may provide three advantages. Firstly, it eliminates the need to acquire a well-trained age estimator model beforehand. Secondly, age estimation on the identity encoding helps the model to establish a more age-specific identity representation. Thirdly, the weight $W_C$ in the fully-connected layer is also used as the age embedding bases (bias terms are set to zero) which encodes the exemplar-face information from a metric learning perspective. In notation:

$$a_j = W_C[j] \tag{1}$$

where $W_C \in R^{K \times D}$, $a_j \in R^D$ and D equals to the channel dimension of the identity encoding. It will be appreciated that this dimension D is not related to the discriminator D at 140 of FIG. 1.

While described in the embodiment of FIG. 1 as an aging simulation or age effect, other multiclass domain transfers applying a continuous effect are contemplated. In a generic sense, the age embedding basis is a class embedding, a latent representation of certain classes, such as age=51 or degree of smile=40.

Personalized Age embedding Transformation (PAT): Face aging is a challenging and ambiguous task in nature as different facial signs/symptoms age differently for different people at different stages. Thus, personalization is desired in performing face aging. In model 100, this personalization is characterized by a residual age embedding calculated from the age probability distribution $p_{i,j} \in R^K$ and the exemplar-face aging basis $a_{i,j} \in R^D$ where i denotes the sample i and j $\in$1, 2, ... K denotes the age. To obtain the personalized aging basis for any target age $t_i$ the process is formulated as the following operation:

$$\tilde{a}_{i,t_i} = (\Sigma_{j=1}^{K} p_{i,j} a_{i,j} - a_{i,j=m_i}) + a_{i,j=t_i} \quad (2)$$

The $\Sigma_{j=1}^{K} p_{i,j} a_{i,j}$ term represents the personalized aging basis of the identity by taking the expected value of the aging basis based on the age probability distribution. Then, the residual age embedding is obtained by subtracting the exemplar-face aging basis at the current (model-estimated) age $a_{i,j=m_i}$ from the personalized aging basis. The residual age embedding preserves the identity's personalized factors while removing the prevailing aging factors at the model-estimated age. The final personalized target age embedding $\tilde{a}_{i,t_i}$ is obtained by adding the exemplar-face aging basis at the target aging basis $a_{i,j=t_i}$, which encodes the shared aging factors at the target age among the entire population. With the personalized target age embedding $\tilde{a}_{i,t_i}$, then applied is an affine projection transformation to derive the scale and shift coefficients for the original identity encoding $E(x_i)=e_i$, similar to Conditional BN [8] and AdaIN [13]:

$$PAT(e_i,t_i) = e_i, t_i = \gamma_\theta(\tilde{a}_{i,t_i}) * e_i + \beta_\varphi(\tilde{a}_{i,t_i}) \quad (3)$$

In experiments, there was no observed significant performance difference w/wo $\beta_\theta(\tilde{a}_{i,t_i})$.

Continuous Aging: As the aging bases from the fully-connected layer encodes every single age, (e.g. in 1 year increments, in accordance with an embodiment) continuous aging is naturally supported by choosing any arbitrary target age (as an input 118). While some previous group-based approaches may support continuous aging via linear interpolation in the latent space, the anchor age groups need to be carefully selected.

The technique and methods of the embodiments, however, explicitly model a fine-controlled age progression by learning the aging basis separately for each age (e.g. in classes 1, 2, 3, ... K where each class is a 1 year range).

Objective

In accordance with an embodiment, a design of the objectives ensures the synthesized face image 106 reflects accurate age progression/regression, preserves the identity, and looks realistic.

Mean-Variance Age Loss: The age loss plays two roles in the network: 1) it helps the estimator (C) learn good aging bases for all ages; and 2) it guides the generator (G) by estimating the age of the generated fake images. To achieve both goals, in accordance with an embodiment, the mean-variance age loss proposed by [25] is adopted. Given an input image $x_i$ and an age label $y_i$, the mean-variance loss is defined as:

$$L_{mv} = L_s + \lambda_{mv1} L_m + \lambda_{mv2} L_v \quad (4)$$

$$= \frac{1}{N} \sum_{i=1}^{N} -\log p_{i,y_i} + \frac{\lambda_1}{2} (m_i - y_i)^2 + \lambda_2 v_i;$$

where $m_i = \Sigma_{i=1}^{N} j p_{i,j}$ is the mean of the distribution (e.g. from Eq. (2)) and $v_i = \Sigma_{j=1}^{K} p_{i,j} * (j - m_i)^2$ is the variance of the distribution.

In addition to being more effective than other losses on the age estimation task, mean-variance loss also satisfies a desire, in accordance with an embodiment, to learn a relatively concentrated age distribution while capturing the age continuity for the adjacent aging bases. In accordance with an embodiment, the supervised age loss is formulated as:

$$L_{real} = L_{mv}(C(E(x)), y) \quad (5)$$

For guiding face aging, in accordance with an embodiment, the embedded age estimator 146 is applied at both the transformed identity encoding level and the generated image level (as shown in FIG. 1), such that, in accordance with an embodiment:

$$L_{fake} = \lambda_{fake1} L_{mv}(\hat{C}(PAT(E(x),t)),t) + \lambda_{fake2} L_{mv}(\hat{C}(\hat{E}(G(PAT(E(x),t)))),t) \quad (6)$$

When the age estimator $\hat{C}$ 146 and encoder $\hat{E}$ 142 are used on the transformed identity encodings 126 and fake images 106, their respective weights are not updated during back-propagation.

L1 Reconstruction Loss: Another important aspect, in accordance with an embodiment, is to preserve the identity of the individual. L1 pixelwise reconstruction loss (e.g. at identity loss 136) is applied on the synthesized face by setting the target age to its model-estimated age. Specifically, it is formulated as:

$$L_{idt} = \frac{1}{N} \sum_{i}^{N} \|G(PAT(E(x_i), m_i)) - x_i\|_1 \quad (7)$$

An experiment was conducted with a cycle-consistency loss as proposed in StarGAN [6] to enforce the identity criteria. It was disclosed that the pixel-wise L1 reconstruction loss is sufficient to achieve the goal without extensive efforts in tuning the hyper-parameters.

Adversarial Loss: To produce high fidelity images, in accordance with an embodiment GAN loss (e.g. 138) is applied in the unconditional adversarial training manner. More specifically, in accordance with an embodiment Patch-GAN [14] discriminator (140) is adopted and optimized on the hinge loss, formulated as:

$$L_{adv-D} = E_{z \sim p_{data}(z)}[\max(1-D_{(z)},0)] + E_{(x,t) \sim p_{data}(x)}[\max(1+D(G(PAT(E(x),t))),0)] \quad (8)$$

where the data distribution is denoted as $x \sim p_{data}(x)$ and $z \sim p_{data}(z)$. Further:

$$L_{adv-G} = E_{(x,t) \sim p_{data}(x)}[-D(G(PAT(E(x),t)))] \quad (9)$$

In the experiment, it is observed that sampling real examples of the age equal or close to the target age $t_i$ for training the discriminator helps to stabilize the learning process.

In accordance with an embodiment, all objectives are optimized jointly with different balancing coefficients as:

$$\min_{E,C,PAT,G} \lambda_{age}(L_{real} + L_{fake}) + \lambda_{idt} L_{idt} + \lambda_{adv} L_{adv-G} \quad (10)$$

-continued $$\min_D L_{adv-D} \quad (11)$$

Experiments

Datasets: The model was evaluated on FFHQ [15] and CACD2000 [5]. FFHQ includes 70000 images with 1024×1024 resolution. Following the data preprocessing procedures as [24], images with id 0-68999 were used as the training set and images with id 69000-69999 were used for testing. Images were filtered out for: low confidence in differentiating the gender, low confidence in estimating the age, wearing dark glasses, extreme pose, and angle based on the facial attributes annotated by Face++ (facial attribute annotation API: URL www.faceplus.com).

As the annotation from [24] only includes the age group label, the age label information was acquired from [45]. To reconcile both age group labels and age labels, images are further filtered out in which the age label disagrees with the age group label. This results in 12488 male and 13563 female images for training, and 279 male and 379 female images for testing. CACD2000 consists of 163446 images where age ranges from 14 to 62 years old and 10% was randomly taken for evaluation. Face++ was used to separate the images into male and female and facial landmarks were extracted using Dlib (Dlib toolkit: URL dlib.net).

Implementation: Since aging patterns are different between males and females, two separate models were trained on the FFHQ dataset for both 256×256 and 512×512 resolutions. Model architecture is modified based on CycleGAN [47]. $\lambda_{mv1}$ and $\lambda_{mv2}$ are set to 0.05 and 0.005 in Eq. (4). $\lambda_{fake1}$ and $\lambda_{fake2}$ are set to 0.4 and 1 in Eq. (6). In Eq. (10), $\lambda_{age}$, $\lambda_{idt}$, and $\lambda_{adv}$ are set to 0.05, 1, and 1 respectively.

Qualitative Evaluation

Face Aging: Test results on FFHQ are presented, comparing with results from [24]. Images for [24] are generated using their provided code (Lifespan official code: URL github.com/royorel/Lifespan_Age_Transformation_Synthesis). To illustrate the model performance across different ages, 6 input examples A-F from 4 representative age groups (<30, 30-40, 40-50, 50+) are shown and the results are generated for each group and set out in arrays 200, 202, 204, 206, 208 and 210 of FIGS. 2A, 2B, 2C, 2D, 2E and 2F. The input image is in left most column and the 4 target ages progress to the right. The top row shows the Lifespan output and the middle and bottom rows show output of a model in accordance with embodiments herein where the bottom row is at image size 512×512.

Figure 2A:
FIGS. 2A, 2B, 2C, 2D, 2E and 2F are arrays of images showing input images with results from two models in accordance with respective embodiments herein and results from a model in accordance with the prior art for six examples showing more aging details and identity preservation in the results from the two models in accordance with respective embodiments herein.
Figure 2B:
Figure 2C:
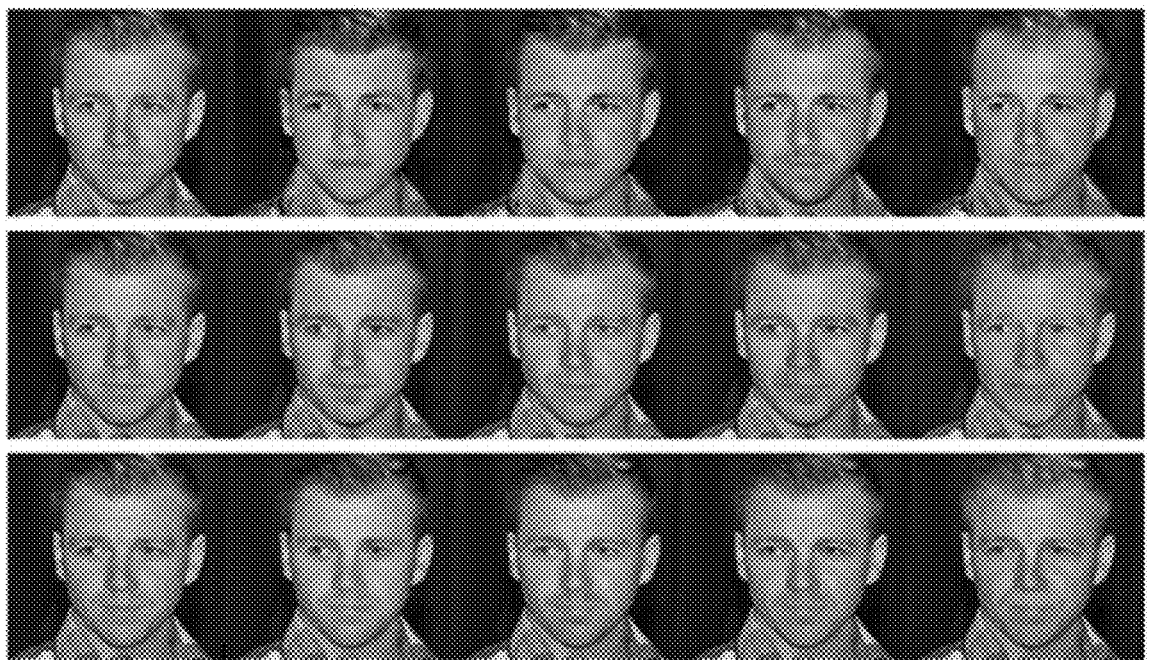
Figure 2D:
Figure 2E:
Figure 2F:
Figure 3A:
FIGS. 3A, 3B, 3C and 3D are arrays of images showing input images with results from a model in accordance with an embodiment herein and results from three models in accordance with the prior art for four examples.
Figure 3B:
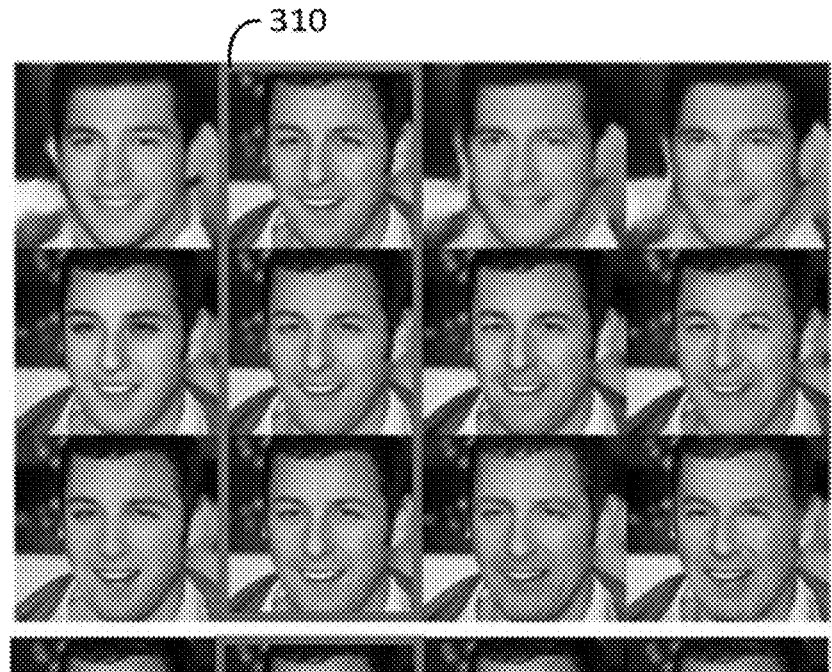
Figure 3C:
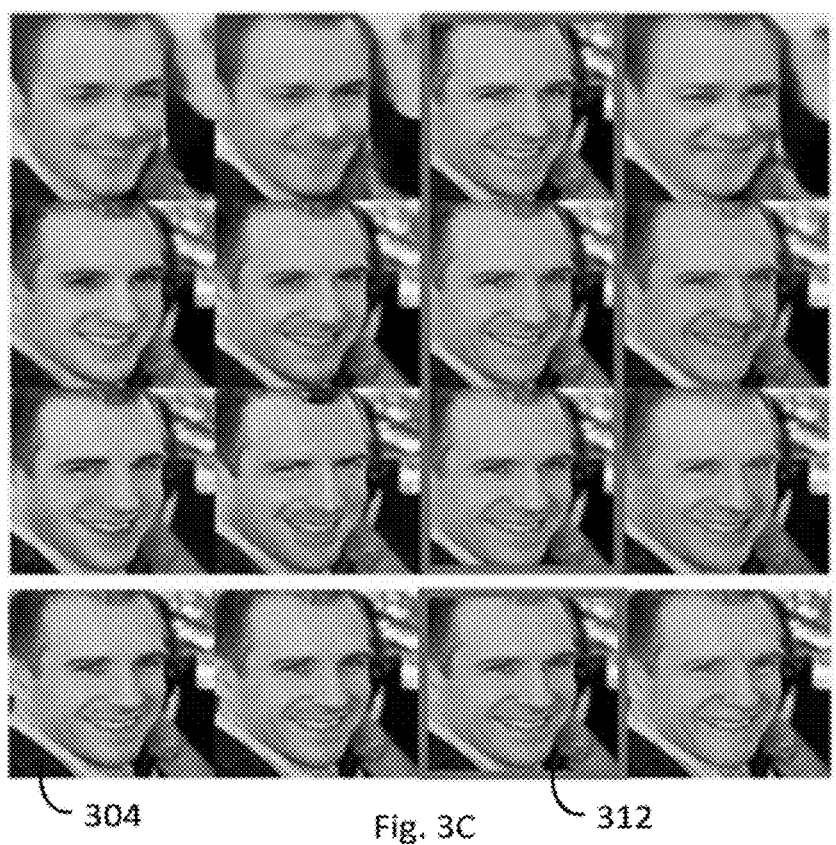
Figure 3D:
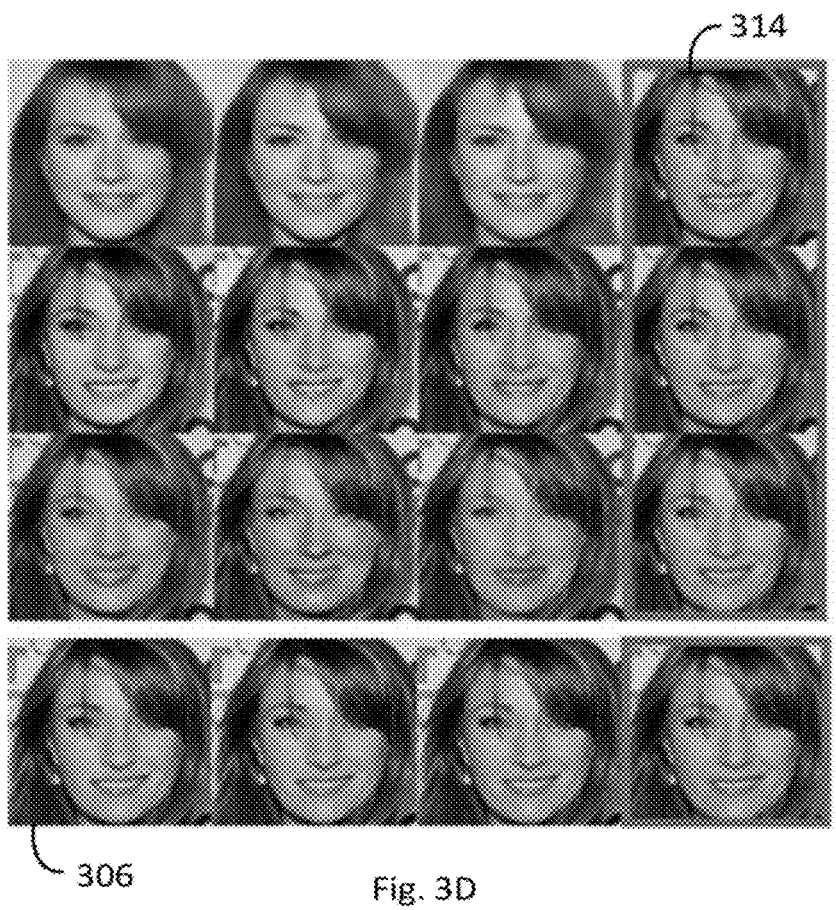

The target ages (shown in the columns to right of input image) for the model are chosen as 25, 35, 45, and 55 respectively. As can be seen in FIGS. 2A, 2B, 2C, 2D, 2E and 2F, the images generated by the model in accordance with embodiments herein result in fewer artifacts and exhibit more clear aging details, such as beard color change (examples 200 and 204 of FIGS. 2A and 2C) and wrinkles on different parts of the face (see examples 202, 204, 206 and 208 of FIGS. 2B, 2C, 2D and 2E). A convincing detail in example 210 of FIG. 2F shows that the personal traits (a mole 210A) are well preserved using the model.

Also directly generated were images on CACD2000 using the models trained on FFHQ in the resolution of 256×256 (bottom (fourth) row) to compare with CAAE[46] (top (first) row), IPCGAN [41] (second row), and S2 GAN [10] (third row) in examples 300, 302, 304 and 306 of FIGS. 3A, 3B, 3C and 3D. Input images 308, 310, 312 and 314 are wrapped in boxes. The demonstrated images are the presented examples in [11], which is the state-of-the-art work on CACD2000. For all age groups (11-30, 31-40, 41-50 and 50+ from left to right columns), the model in accordance with an embodiment herein presents more evident and fine-grained aging effects comparing with all previous works.

Figure 4:
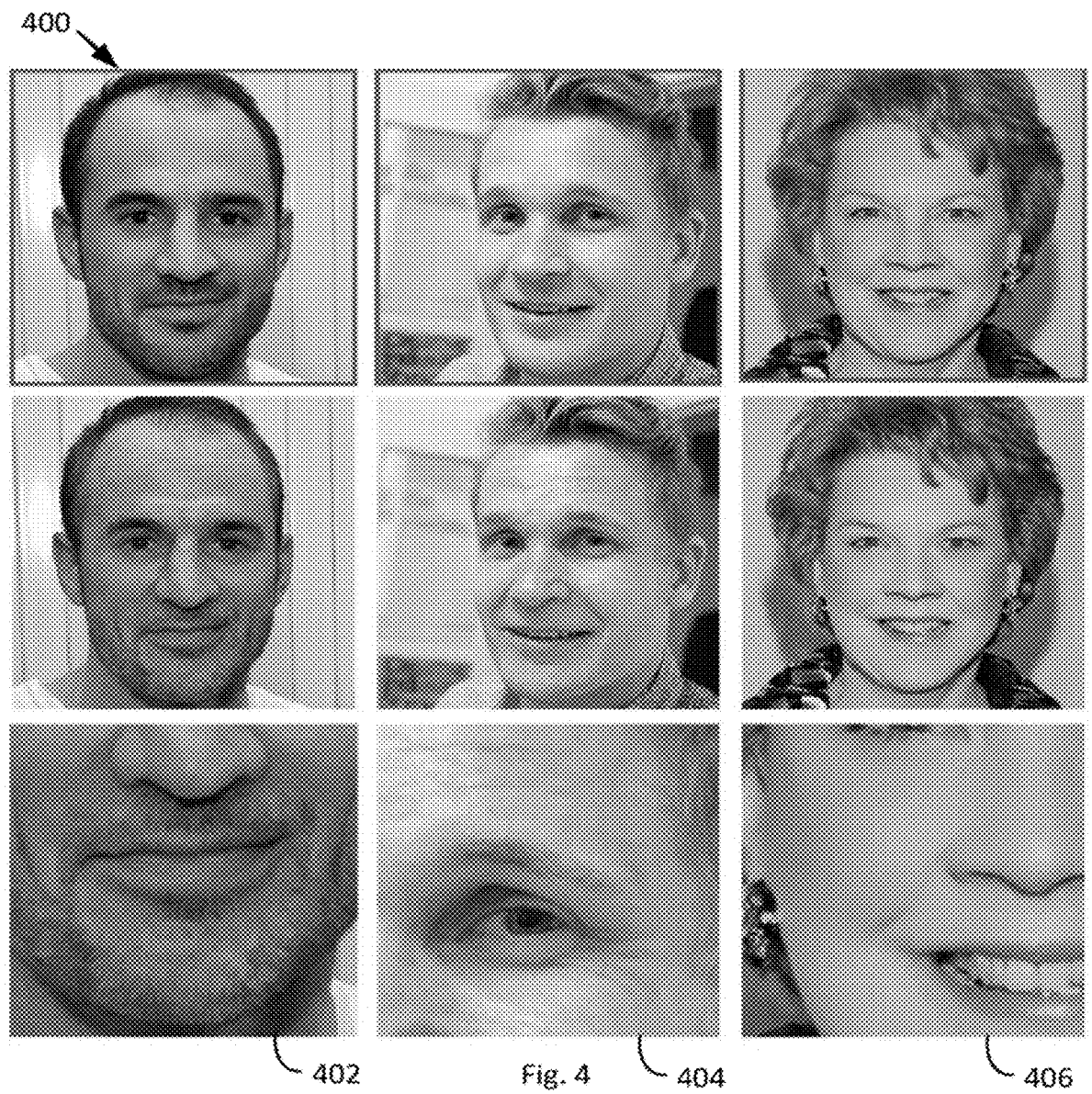
FIG. 4 is an array of images showing input images with results from a model in accordance with an embodiment herein and enlarged face crops of those results showing more detail of aging.

Aging Details: Generated images using the model in accordance with embodiments herein express a significant level of aging details on different parts of the face (e.g. face crops). In the 3 examples of the array 400 of FIG. 4, there is demonstrated three enlarged face crops 402, 404 and 406 (bottom row) from the generated images (middle row), which give a clear and detailed view of enhanced wrinkles, skin smoothness, color change of beard and eyebrow. The left most example 402 shows a real/target age pair at 36/55 (i.e. the input image shows a 36 year old individual and the generated image shows the image at a target age of 55. The middle example 404 shows a real/target age pair at 33/55 and the right most example 406 shows a real/target age pair at 66/30.

Figure 5A:
FIGS. 5A and 5B are arrays of image showing input images with results a model in accordance with an embodiment herein and results from a model in accordance with the prior art for two examples showing continuous ageing over 4 year age gaps from age 21.
Figure 5B:

Continuous Aging: In FIGS. 5A and 5B, image arrays 500 and 502 illustrate some examples of continuous aging results comparing images generated by the model in accordance with an embodiment in second and fourth rows with images generated by the model of Lifespan [24] in first and third rows. In each array the input image is shown in the left most column. An age step of 4 was chosen for presentation, (e.g. 21, 25, 29, . . . 65 in columns from left to right). A gradual and smooth natural aging process (e.g. wrinkle depth change, beard, and pigmentation on face) can be observed from images generated by the model in accordance with an embodiment while retaining personal traits. The interpolation-based method in Lifespan, however, lacks the ability to generate images of well-aligned target ages and does not preserve certain personalized information. Further, the model in accordance with an embodiment generates more realistic aging effects with minimal artifacts.

Quantitative Evaluation

Identity Preservation: A face verification rate metric was used to evaluate identity preservation. Specifically, the evaluation protocol of [10] was followed on an age group basis for a fair comparison with prior works. The face verification rate was calculated between all combination of image pairs, i.e. (test, 10-29), (test, 30-39), . . . , (30-39, 40-49), (40-49, 50-59). A face verification score was obtained from Face++ and the threshold was set as 76.5 (@FAR=1e-5). The complete results are presented in Tables 1 and 2 for CACD2000 and FFHQ respectively. As the results suggest, the model in accordance with an embodiment achieves the highest face verification rate for both datasets among all candidates, which indicates it best meets the identity preservation requirement of the task.

TABLE 1

|  | Average of All Pairs |
| --- | --- |
| CAAE [46] | 60.88% |
| IPCGAN [41] | 91.40% |
| S$^2$ GAN [10] | 98.91% |
| Lifespan [24] | 93.25% |
| Ours | 99.97% |

TABLE 2

|  | Average of All Pairs |
|---|---|
| Lifespan [24] | 87.11% |
| Ours | 99.98% |

Aging Accuracy: To assess aging accuracy, an unbiased age estimator was used to infer the age of the generated images. To compare with prior group-based methods on CACD2000, images were generated to align with the CACD2000 age group settings. Age group size was adaptively incremented/decremented by a factor of 10 from input image's real age as the target age for generation, i.e. target age 33 was used for generating an image of age group 30-40 given current age of 23. Without access to [10]'s evaluation age estimator nor its pre-trained model for assessing the model in accordance with an embodiment herein to perform a direct comparison, Face++'s age estimation results were used on the model in accordance with an embodiment herein and one of accessible prior work IPCGAN [41], which is also evaluated in [10] to show relative comparison. Evaluation of FFHQ follows the same procedure as CACD2000. The evaluation results are shown in Table 3 and 4 for CACD2000 and FFHQ respectively. As the results suggest, the model in accordance with an embodiment herein evaluated using Face++ has a more reasonable mean age at each age group than IPCGAN [41] and Lifespan [24] on CACD2000 and has a similar performance as Lifespan on FFHQ.

TABLE 3

|  | 10-29 | 30-39 | 40-49 | 50+ |
|---|---|---|---|---|
| CAAE [46] | 29.6 | 33.6 | 37.9 | 41.9 |
| S2 GAN [10] | 24.0 | 36.0 | 45.7 | 55.3 |
| IPCGAN [41] | 27.4 | 36.2 | 44.7 | 52.5 |
| IPCGAN [41] (Face++) | 42.4 | 47.1 | 51.9 | 56.0 |
| Lifespan [24] (Face++) | — | 40.2 | — | 64.3 |
| Ours (Face++) | 30.5 | 38.7 | 46.9 | 60.0 |

TABLE 4

|  | 10-29 | 30-39 | 40-49 | 50+ |
|---|---|---|---|---|
| Lifespan [24] | — | 38.4 | — | 63.8 |
| Ours | 30.7 | 38.4 | 47.7 | 62.1 |

Image Fidelity: For image fidelity, the Frechet Inception Distance (FID) [12] metric was used to evaluate the model in accordance with an embodiment herein on both datasets. Similar to the image generation settings as before, the FID score was calculated on the generated images corresponding to the same age group as theirs on CACD2000. For comparing with [24] on FFHQ, FID score was calculated on the generated images, that share the same age group range. The results are shown in the Table 5 (FID evaluation: lower is better). On both datasets, the model in accordance with an embodiment herein achieves the lowest FID score, which quantitatively demonstrates superiority in the image quality aspect.

TABLE 5

|  | CACD2000 | FFHQ |
|---|---|---|
| CAAE [46] | 44.2 | — |
| IPCGAN [41] | 9.1 | — |
| S2 GAN [10] | 8.4 | — |
| Lifespan [24] | 11.7 | 26.2 |
| Ours | 6.7 | 18.5 |

Model Interpretability and Ablation Study

Continuous Aging: To evaluate how well the model in accordance with an embodiment herein generates synthesized images in a continuous setting, an age estimator was used to predict age on the generated fake images of, respectively, 1) the model at ages 25 to 65 and 2) the linear interpolation approach performed between anchor aging bases. The anchor basis was generated by taking the mean of every aging bases within an age group. The age step was chosen as 3 based on the MAE of the estimator.

Figures 6A, 6B:
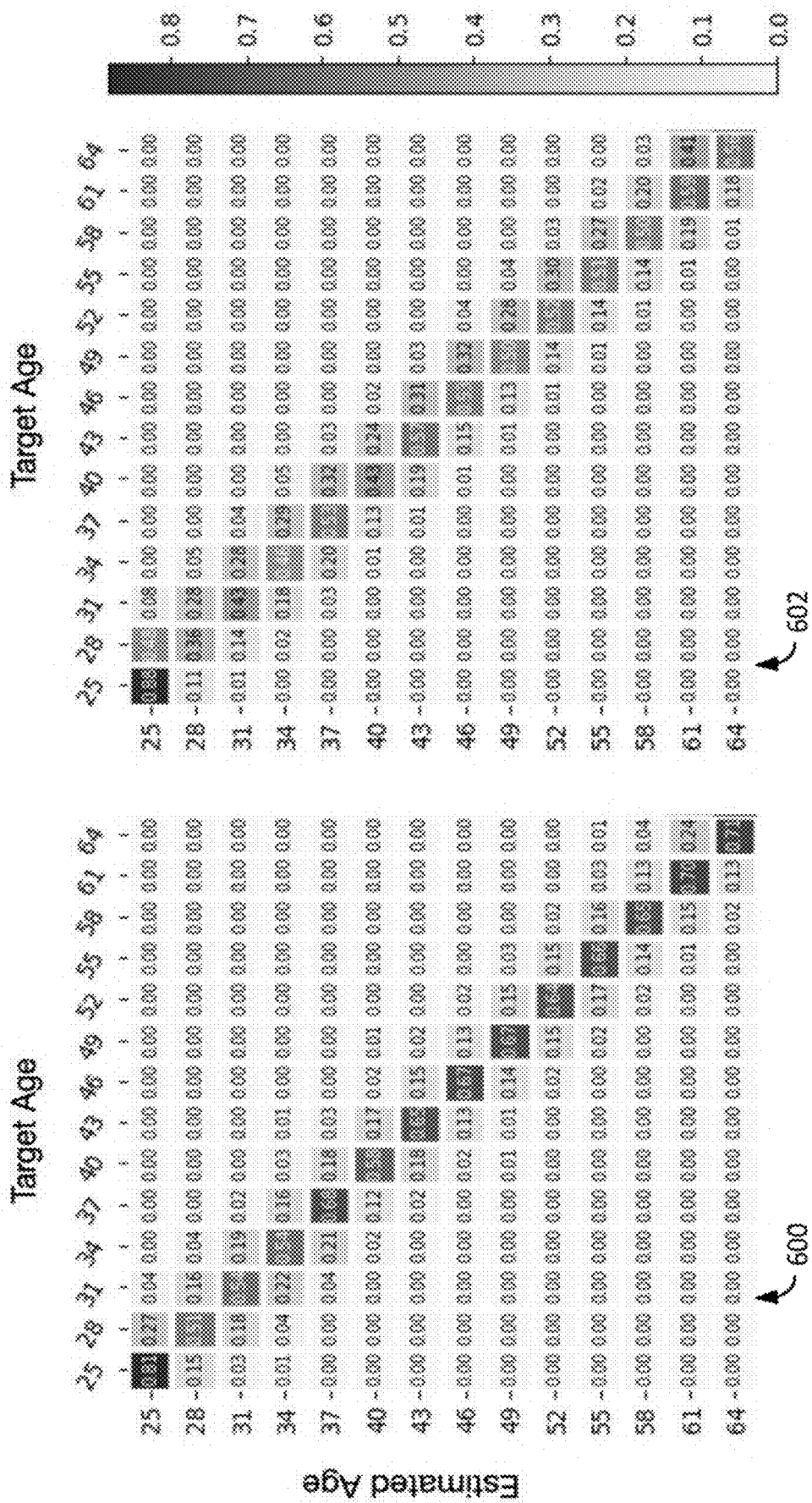
FIGS. 6A and 6B show confusion matrices of continuous aging comparing results from a model in accordance with an embodiment herein and results from a model in accordance with the prior art.

A confusion matrix was calculated in terms of aging accuracy for each approach using the age estimator jointly trained on the FFHQ dataset. The respective confusion matrices 600 and 602 of FIGS. 6A and 6B indicate that generated fake images in accordance with a model herein express a more evident continuous aging trend with much higher aging accuracy than do generated fake images of the linear interpolation approach.

Figure 7:
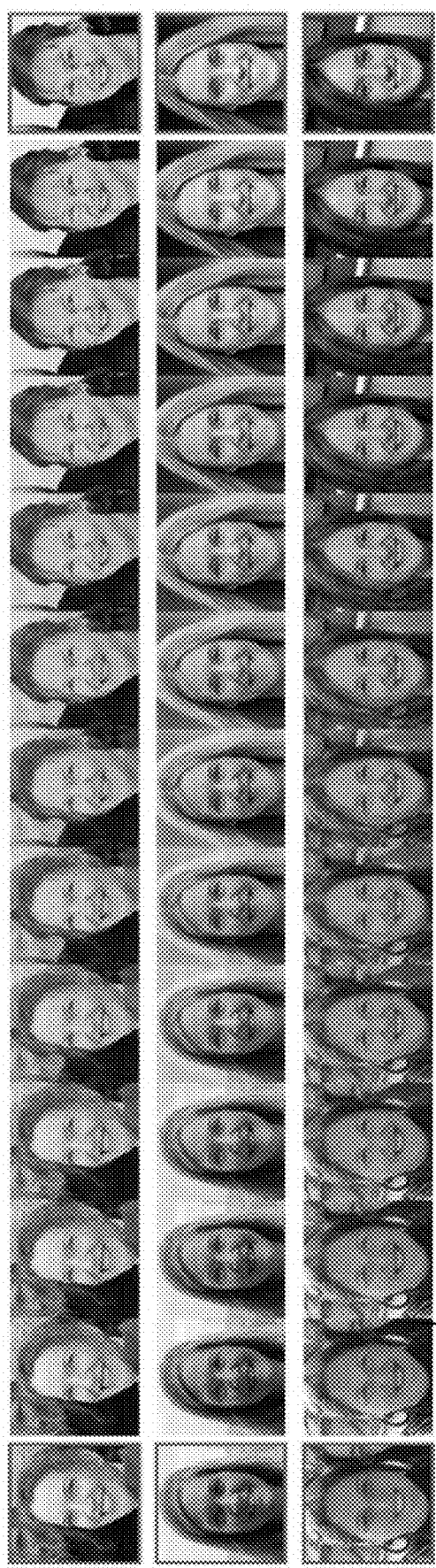
FIG. 7 is an array of images showing linear interpolation between transformed identity encodings from a model in accordance with an embodiment herein.

Interpolation between Two Identities in Latent Space: In image array 700 of FIG. 7, there is further illustrated that the model in accordance with an embodiment herein also learns a disentangled representation of age and identity in latent space. FIG. 7 shows linear interpolation between transformed identity encodings where real images are in boxes (left most column and right most column) in three examples of pairings. From left to right, linear interpolation was performed between two images' transformed identity encodings at the same target age 65. Images for the interpolated encodings were generated. As shown, the identity changes gradually while maintaining the respective age. Personal traits, such as eye color and teeth shape, smoothly change from one person to the other.

Figure 8:
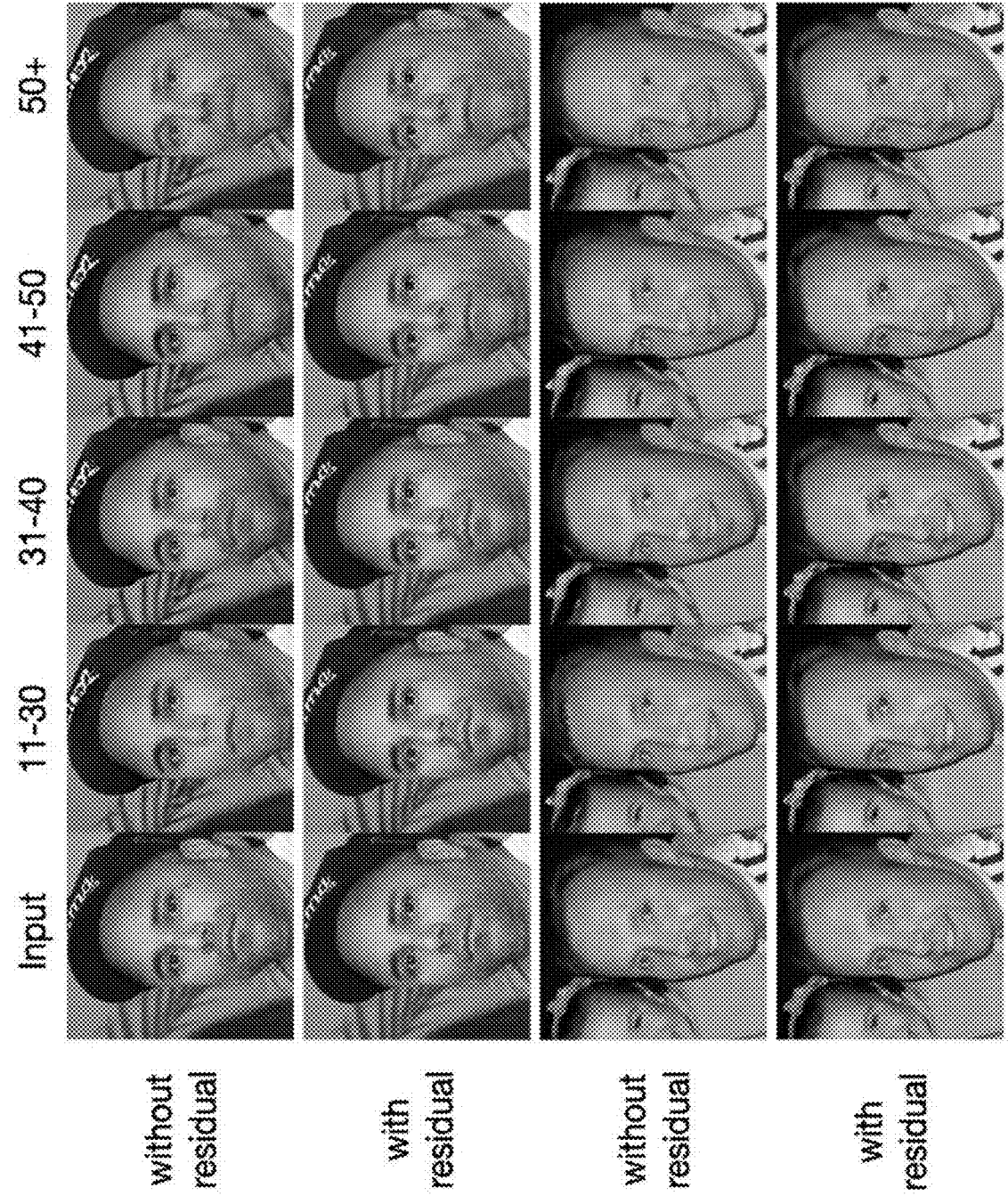
FIG. 8 is an array of images showing input images and results from a first model in accordance with an embodiment herein using residual embeddings and from a second (comparator) model in accordance with an embodiment herein without using residual embeddings.

Use of the Residual Embedding: A feature of the model architecture in accordance with an embodiment is the formulation of the personalized age embedding, which incorporates both personalized aging features of the individual and shared aging effects among the entire population. To better illustrate and understand the effectiveness of the design, a comparator model was trained without adding the residual embedding (i.e. directly applying the target age's exemplar-face aging basis $a_{i,j}=t_i$), and compared with the model in accordance with an embodiment here where residual embedding was added. The image array 800 of FIG. 8 displays two examples comparing results without residual embeddings (first and third rows) and with residual embeddings (second and fourth rows). Input images are in the leftmost column and ages ranges 11-30, 31-40, 41-50 and 50+ are in columns from left to right. On both examples, more unnatural artifacts and a tendency to exemplar-face modification are observed in the images generated without residual embeddings.

Application(s)

In an embodiment, disclosed technologies and methodologies include developer related methods and systems to define (such as through conditioning/training) a model having a generator and age estimator for image to image translation that provides age simulation. The generator exhibits continuous control using a plurality of model-estimated age embeddings over a plurality of continuous ages learned through conditioning to create smooth transformations between an original image (an input image) and a transformed image (a new image). In an embodiment the image is a face (e.g. of a face). In an embodiment, personalized age embeddings (determined from the plurality of model-estimated age embeddings using the target age and a model-estimated age of the original image) are used to transform encoder generated features from an encoder component of the model.

In an embodiment, model in accordance with an embodiment herein for image-to-image translation are incorporated a computer implemented method (e.g. an application) or computing device or system to provide a virtual reality, augmented reality and/or modified reality experience. An application is configured to facilitate a user to use a camera equipped smartphone or tablet, etc. to take, a selfie image (or video) and a generator G applies the desired effect such as for playback or other presenting by the smartphone or tablet.

In an embodiment a generator G as, taught herein is configured for loading and executing on commonly available consumer smartphones or tablets (e.g. target devices). An example configuration includes devices with the following hardware specification: Intel® Xeon® CPU E5-2686 v4 @ 2.30 GHz, profiled with only 1 core and 1 thread. In an embodiment, the generator G is configured for loading and executing on a computing device with more resources including a server, desktop, gaming computer or other device such as having multiple cores and executing in pie threads. In an embodiment, generator G is provided as a (cloud-based) service.

In an embodiment, in addition to developer (e.g. used at training time) and target (used at inference time) computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects disclosed herein.

Figure 9:
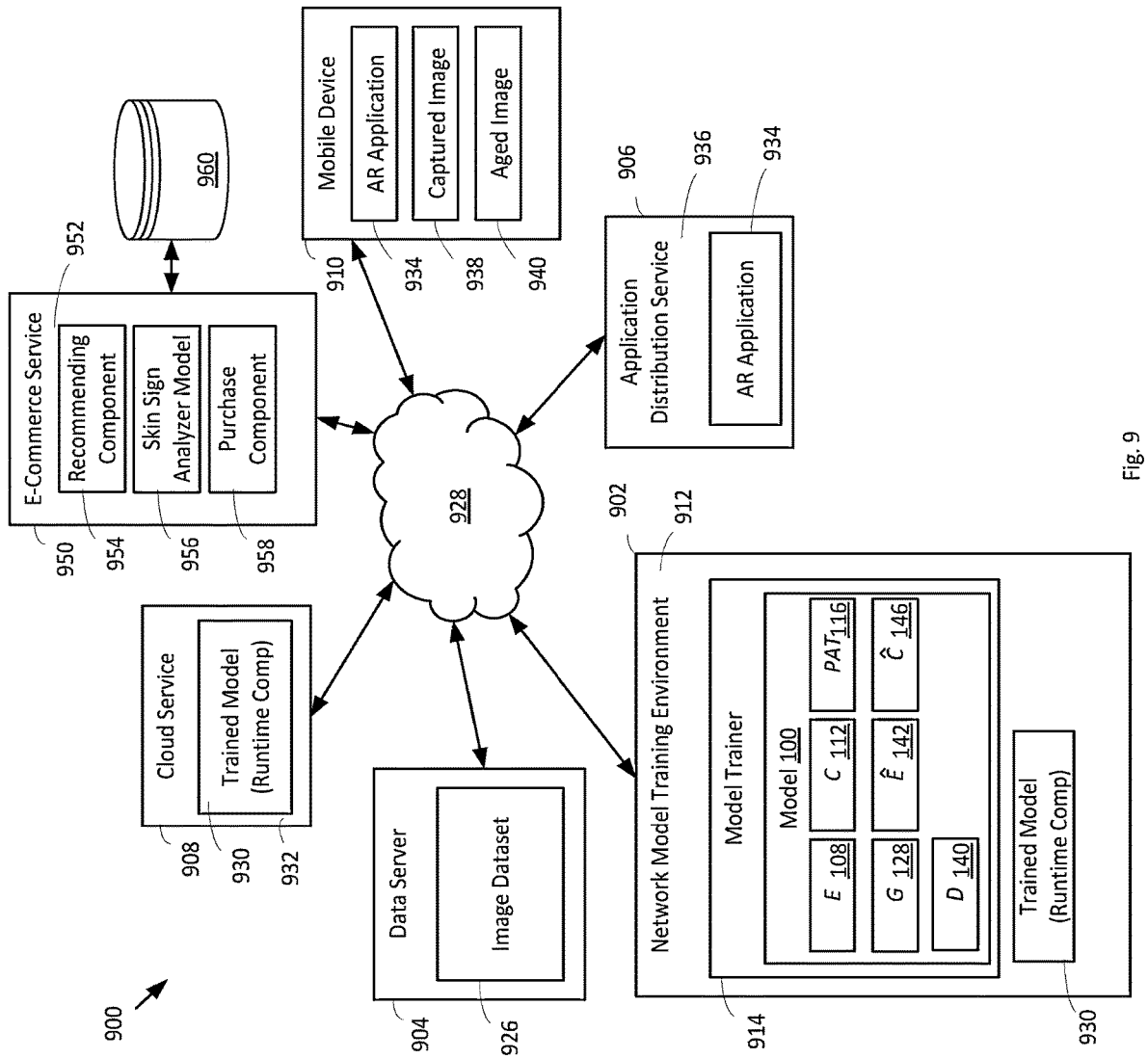
FIG. 9 is a block diagram of a computer system comprising a plurality of computing devices in accordance with an embodiment.

FIG. 9 is a block diagram of computer system 900, in accordance with an embodiment. Computer system 900 comprises a plurality of computing devices (902, 904, 906, 908, 910 and 950) which include servers, developer computers (PCs, laptops, etc.) and typical user computers (e.g. PCs, laptops, and smaller form factor (personal) mobile devices such as smartphones and tablets, etc.). In the embodiment, computing device 902 provides a network model training environment 912 comprising hardware and software, in accordance with a teaching herein, to define a model for image-to-image translation providing continuous aging. Components of network model training environment 912 include a model trainer component 914 to define and configure, such as through conditioning, a Model comprising E 108, C 112, PAT 116, C 128 Ê 142 Ĉ 146, and D 140. Components 140, 142 and 146 are constructs for training but are not used as runtime components such as for generating a new image in a runtime (inference time) application.

In the embodiment, the conditioning is performed such s accordance with the model network architecture 100 of FIG. 1. In the embodiment, a data server (e.g. 904) or other form of computing device stores an image dataset 926 of images for training, and other purposes etc. and is coupled through one or more networks, representatively shown as network 928, which network 928 couples any of the computing devices 902, 904, 906, 908 and 910. Network 928 is, by way of example, wireless or otherwise, public or otherwise, etc.

It will also be understood that system 900 is simplified. At least any of the services may be implemented by more than one computing device.

Once trained, the model 100 as trained may be further defined as desired to comprise runtime components and be provided as a trained model 930. According to the techniques and methodologies herein, in embodiments, the trained model 930 is made available for use in different ways. In one way in an embodiment, such as is shown in FIG. 9, trained model 930 is offered as a cloud service 932 or other software as a service (SaaS) offering via a cloud server 908. A user application such as an augmented reality (AR) application 934 is defined for use with the cloud service 932 providing an interface to trained model 930. In an embodiment, AR application 934 is provided for distribution (e.g. via download) from an application distribution service 936 provided by a server 906.

Though not shown, in an embodiment, AR application 934 is developed using an application developer computing device for particular target devices having particular hardware and software, particularly operating system configuration, etc. In an embodiment, AR application 934 is a native application configured for execution in a specific native environment such as one defined for a particular operating system (and/or hardware). Native applications are often distributed through an application distribution service 936 that is configured as an e-commerce "Store" operated by a third party service), though this is not necessary. In an embodiment, the AR application 920 is a browser-based application, for example, configured to execute in a browser environment of the target user device.

AR application 934 is provided for distribution (e.g. downloading) by user devices such as a mobile devices 910. In an embodiment, AR application 934 is configured to provide an augmented reality experience (for example via an interface) to a user. For example, an effect is provided to an image via processing by the inference time generator 930. The mobile device has a camera (not shown) to capture an image (e.g. captured image 938) which, in an embodiment, is a still image, comprising a selfie image. An effect is applied to the captured image 938 using image processing techniques providing image to image translation. An age simulated image (a new image) 940 is defined and displayed on a display device (not shown) of the mobile device 910 to simulate the effect on the captured image 938. The position of the camera may be changed and the effect applied in response to further captured image(s) to simulate the augmented reality. It will be understood that the captured image defines a source, an input image or original image and the aged image defines a new image, a translated or transformed image or an image to which an effect is applied.

In the cloud service paradigm of the embodiment of FIG. 9, the captured image 938 is provided to cloud service 932 where it is processed by the trained model 930 to perform image to image translation with continuous aging to define aged image 940. The aged image 940 is communicated to mobile device 910 for display, saving (storing), sharing, etc.

In an embodiment, AR application 934 provides an interface (not shown), for example, a graphical user interface (GUI), which may be voice enabled, for operating the AR application 934. The interface is configured to enable image capture, communication with the cloud service, and display, saving and/or sharing of the translated image (e.g. aged image 940). In an embodiment, the interface is configured to enable a user to provide inputs for the cloud service, such as to define a target age. In an embodiment, the input comprises an age delta. As noted previously, in an embodiment, the input comprises a product/service selection. For example the product/service selection is associated with an age delta to rejuvenate an input image. In an example, the input may be a lifestyle factor such as smoking rate, sun exposure rate or other factor which contributes to an appearance of premature aging. The lifestyle factor may be associated with an age delta to apply to the input image.

In the embodiment of FIG. 9, AR application 934 or another (not shown) provides access (e.g. via a communication interface) to a computing device 950 providing an e-commerce service 952. E-commerce service 952 comprises a recommendation component 954 to provide (personalized) recommendations for a product, service or both. In the embodiment such product and/or service is an anti-aging or rejuvenation product and/or service, etc. In an embodiment such a product and/or service is associated with specific skin signs for example. In an embodiment, a captured image from device 910 is provided to e-commerce service 952. A skin sign analysis is performed such as by a skin sign analyzer model 956 using deep learning according to an embodiment. Image processing using a trained model analyzes the skin (e.g. zones of the face associated with the specific skin signs) to generate a skin analysis comprising scores for at least some of the skin signs. The value of individual scores may be generated on an image using (dedicated) aging sign estimation models (e.g. a type of classifier) based on the ResNet [27] architecture, for example, such as previously described for analyzing training set data.

In the embodiment, the skin signs (e.g. scores thereof) are used to generate personalized recommendations. For example a respective product (or service) is associated to one or more skin signs and to particular scores (or ranges of scores) for such signs. In the embodiment, information is stored in a database (e.g. 960) for use by e-commerce service 952 such as via appropriate look-ups matching a user's data to the product and/or service data. In an embodiment, further user data for use by the recommendation component 954 comprises any of gender, ethnicity and location data, etc.

In the embodiment, skin sign scores of a user's captured image are provided from e-commerce service to display via AR application 934 such as in the AR application interface. For example, in an embodiment, other means are used to generate or modify the scores such as by application of a rule or other code.

In an embodiment, an annotated image is provided from the user's captured image (i.e. an input image), for example, where the annotate image comprises the input image annotated with any of: skin sign scores, skin sign description/ information associated with such scores, product information associated with such scores, or service information associated with such scores.

In an embodiment, which is not to be limiting, a user receives a personalized product recommendation such as one recommended by e-commerce service 952. The user selects a particular product or service. The selected product or service is associated to an age delta (which may be rules determined (e.g. factoring in a subject's real age, a length of product use, other demographic or geographic data, etc.) thereof invoke a modification of the input image. The modification simulates an age of the subject in the input image for example to produce a new image at the new target age. An input image and target age as determined from the product or service selection may be provided to cloud service 932 to receive an aged image (e.g. an instance of 940).

In the embodiment of FIG. 9, e-commerce service 952 is configured with a purchase component 958 such as to facilitate the purchase of a product or service. Products or services comprise cosmetic products or services or others. Though not shown, e-commerce service 952 and/or AR application 934 provide image processing of a captured image to simulate a cosmetic product or services such as the application of makeup to a captured image producing an image to which an effect is applied.

Though captured images are used in the above described embodiments as source images for processing, in an embodiment, other source images (e.g. from other sources than a camera of device 910) are used. An embodiment may use a captured image or other source image. Whether a captured image or another image, in an embodiment, such images are high resolution images to improve the user experience as the trained model 930 is trained for same. Though not shown, in the embodiment, images used by a skin sign analyzer model 956 are downscaled when analyzed. Other image pre-processing is performed for such analysis.

In an embodiment, AR application 934 may direct the user in respect of the quality features (viz. lighting, centering, background, hair occlusion, etc.) to improve performance. In an embodiment, AR application 934 rejects an image if it does not meet certain minimum requirements and is unsuitable.

While shown as a mobile device in FIG. 9, in an embodiment, the computing device 910 may have a different form factor, as stated. Rather (or in addition to) providing trained model 930 as a cloud service, it may be hosted and executed locally to a particular computing device having sufficient storage and processing resources.

Thus in an embodiment, AR application 934 performs and method and the computing device is configured to: provide an interface to receive an input image; communicate the input image to a recommendation service to receive a skin analysis and a recommendation comprising at least one recommended product or service responsive to the analysis; provide an interface to present an annotated input image displaying the skin analysis and displaying the at least one recommendation; provide an interface to select the product or service from the recommendation; responsive to a selecting, generate an age simulation image using a target age associated with the selected product or service and the input image and present same via an interface; and provide an interface to purchase a product or service via an ecommerce service.

In an embodiment, the AR application communicates for a recommendation and the recommendation is provided without performing a skin analysis, for example, based on a user's set of preferences—e.g. selecting recommendations for an area of the face or a particular one or more skin signs.

In an embodiment, AR application 934 generates a second age simulation image at a second target age—for example, where the second target age is without reference to use of a recommended product. In an embodiment, the two age simulation images are presented simultaneously for comparison. Effects, such as makeup and hair effects, may be applied to any of the age simulation images.

In an embodiment, the computing device comprises a camera and wherein the processing unit receives the original image from the camera.

In an embodiment, the product comprises one of a rejuvenation product, an anti-aging product, and a cosmetic make-up product. In an embodiment, the service comprises one of a rejuvenation service, an anti-aging service, and a cosmetic service.

In an embodiment, the computing device such as mobile device 910 is configured to perform a method in accordance with the computing device aspect thus described. Other aspects will be apparent such as computer program product aspects.

In an embodiment, the network model training environment provides a computing device configured to perform a method such as a method to configure by conditioning a (GANs-based) age simulation generator.

In an embodiment, there is provided a computing device comprising a face-effect unit including processing circuitry configured to apply at least one continuous effect to a source image and to generate one or more virtual instances of an applied-effect image on an e-commerce interface, the face-effect unit utilizing a encoder and estimator with a generator to simulate the applied continuous effect (e.g. aging), where the applied continuous effect has continuous control over a respective classes of the effect (e.g. ages over an age range, degree of smile over a smile range, etc.)

In an embodiment the computing device comprises a recommendation unit including processing circuitry configured to present a recommendation of a product and/or service, and receive a selection of the product and/or service, wherein the product and/or service is associated with a target age (e.g. a modifier such as a delta relative to a current age or an absolute age number). The face-effect unit is configured to generate the applied-effect image the target age in response to the selection thereby to simulate an effect of the product and/or service on the source image. In an embodiment, the recommendation unit is configured to obtain the recommendation by: invoking a skin sign analyzer to determine current skin sign scores using the source image; and using the current skin sign scores to determine the product and/or service. In an embodiment, the skin sign analyzer is configured to analyze the source image using a deep learning model. In an embodiment, the target age is defined from an aging target modifier associated with the product/service.

In addition to age related embodiments, the proposed network structure, methods and techniques herein can also be applied to other multiclass domain transfer tasks to avoid group-based training and achieve a more accurate continuous modeling. It will be appreciated that a domain transfer task comprises translating a source image from one domain to another such as where an effect is applied. "Multiclass" here references the various degrees or granularity of progression for a continuous effect. In the age examples of a continuous effect, the classes K were discussed. For a smile related continuous effect, classes may represent degrees of a smile, for example, in 1% granularity such as in an embodiment. In the smile example, the age estimator C and its training complement $\hat{C}$ are adapted (e.g. via training) as an estimator for smile estimation (e.g. to predict degrees of a smile rather than age). The estimator is useful to determine model-estimated class embeddings at each of the continuous granular ranges (classes) of the continuous effect representing continuous effect information.

Other multiclass effects (e.g. domain transfers) may be contemplated, including non-facial effects (e.g. degrees of baldness, weight gain, etc.). Thus a generator is enabled to generate from a combined encoder and estimator, a continuous effect image at a target class, the target being one of the classes (i.e. granular ranges) of the effect.

Thus in an embodiment, there is provided a method comprising: providing a unified model to generate, from an input image of a subject, a new image at a target class of a continuous effect for the subject. The model provides a plurality of respective model-estimated class embeddings at each of a plurality of continuous classes representing continuous effect information. The model-estimated class embeddings are learned through joint training of a generator and an estimator embedded into an encoder-decoder architecture of the model. The estimator is configured to determine model-estimated classes of respective subjects using respective encoder generated features responsive to respective input images. The generator generates the new image using the encoder generated features from the input image as transformed by respective ones of the model-estimated class embeddings determined in accordance with the target class.

In an embodiment, the continuous effect is an aging effect and the target range is a specific one of the age classes (e.g. a one of the degrees of the continuous effect), for example, an integer year.

Conclusions

In this work, there is introduced a novel approach to the task of face aging with a specific focus on the continuous aging aspect. There is proposed a unified framework to learn continuous aging bases via introducing an age estimation module to a GAN-based generator. The designed PAT module further enhances the personalization of the exemplar-face aging bases, which results in more natural and realistic generated face images overall. The experiments qualitatively and quantitatively show superior performance on the aging accuracy, identity preservation, and image fidelity on two datasets compared to prior works. Furthermore, the proposed network structure can also be applied to other multiclass domain transfer tasks to avoid group-based training and achieve a more accurate continuous modeling. As noted previously, an example is a smile effect applied to a face. The continuous effect estimator (e.g. C 112), rather than an age estimator comprises a degree of smile effect estimator.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

REFERENCES

The following publications are incorporated herein by reference, where permissible.

[1] Grigory Antipov, Moez Baccouche, and Jean-Luc Dugelay. Face aging with conditional generative adversarial networks. In 2017 IEEE international conference on image processing (ICIP), pages 2089-2093. IEEE, 2017.
[2] Yosuke Bando, Takaaki Kuratate, and Tomoyuki Nishita. A simple method for modeling wrinkles on human skin. In Pacific Conference on Computer Graphics and Applications, pages 166-175. Citeseer, 2002.
[3] Laurence Boissieux, Gergo Kiss, Nadia Magnenat Thalmann, and Prem Kalra. Simulation of skin aging and wrinkles with cosmetics insight. In Computer Animation and Simulation 2000, pages 15-27. Springer, 2000.
[4] D Michael Burt and David I Perrett. Perception of age in adult caucasian male faces: Computer graphic manipulation of shape and colour information. Proceedings of the Royal Society of London. Series B: Biological Sciences, 259(1355):137-143, 1995.
[5] Bor-Chun Chen, Chu-Song Chen, and Winston H Hsu. Cross-age reference coding for age-invariant face recognition and retrieval. In European conference on computer vision, pages 768-783. Springer, 2014.
[6] Yunjey Choi, Minje Choi, Munyoung Kim, Jung-Woo Ha, Sunghun Kim, and Jaegul Choo. Stargan: Unified generative adversarial networks for multi-domain image-to-image translation. In Proceedings of the IEEE conference on computer vision and pattern recognition, pages 8789-8797, 2018.
[7] Yunjey Choi, Youngjung Uh, Jaejun Yoo, and Jung-Woo Ha. Stargan v2: Diverse image synthesis for multiple domains. In Proceedings of the IEEE/CVF Conference on Computer Vision and Pattern Recognition, pages 8188-8197, 2020.
[8] Harm de Vries, Florian Strub, Jeremie Mary, Hugo Larochelle, Olivier Pietquin, and Aaron C Courville. Modulating early visual processing by language. In I. Guyon, U. V. Luxburg, S. Bengio, H. Wallach, R. Fergus, S. Vishwanathan, and R. Garnett, editors, Advances in Neural Information Processing Systems 30, pages 6594-6604. Curran Associates, Inc., 2017.
[9] Ian J Goodfellow, Jean Pouget-Abadie, Mehdi Mirza, Bing Xu, David Warde-Farley, Sherjil Ozair, Aaron Courville, and Yoshua Bengio. Generative adversarial networks. Advances in neural information processing systems, 3(06), 2014.
[10] Zhenliang He, Meina Kan, Shiguang Shan, and Xilin Chen. S$^2$gan: Share aging factors across ages and share aging trends among individuals. In Proceedings of the IEEE International Conference on Computer Vision, pages 9440-9449, 2019.
[11] Zhenliang He, Wangmeng Zuo, Meina Kan, Shiguang Shan, and Xilin Chen. Attgan: Facial attribute editing by only changing what you want. IEEE Transactions on Image Processing, 28(11):5464-5478, 2019.
[12] Martin Heusel, Hubert Ramsauer, Thomas Unterthiner, Bernhard Nessler, and Sepp Hochreiter. Gans trained by a two time-scale update rule converge to a local nash equilibrium. In Advances in neural information processing systems, pages 6626-6637, 2017.
[13] Xun Huang and Serge Belongie. Arbitrary style transfer in real-time with adaptive instance normalization. In ICCV, 2017.
[14] Phillip Isola, Jun-Yan Zhu, Tinghui Zhou, and Alexei A Efros. Image-to-image translation with conditional adversarial networks. CVPR, 2017.
[15] Tero Karras, Samuli Laine, and Timo Aila. A style-based generator architecture for generative adversarial networks. In Proceedings of the IEEE conference on computer vision and pattern recognition, pages 4401-4410, 2019.
[16] Ira Kemelmacher-Shlizerman, Supasorn Suwajanakorn, and Steven M Seitz. Illumination-aware age progression. In Proceedings of the IEEE conference on computer vision and pattern recognition, pages 3334-3341, 2014.
[17] Andreas Lanitis, Christopher J. Taylor, and Timothy F. Cootes. Toward automatic simulation of aging effects on face images. IEEE Transactions on pattern Analysis and machine Intelligence, 24(4):442-455, 2002.
[18] Peipei Li, Yibo Hu, Qi Li, Ran He, and Zhenan Sun. Global and local consistent age generative adversarial networks. In 2018 24th International Conference on Pattern Recognition (ICPR), pages 1073-1078. IEEE, 2018.
[19] Ming Liu, Yukang Ding, Min Xia, Xiao Liu, Errui Ding, Wangmeng Zuo, and Shilei Wen. Stgan: A unified selective transfer network for arbitrary image attribute editing. In Proceedings of the IEEE conference on computer vision and pattern recognition, pages 3673-3682, 2019.
[20] Si Liu, Yao Sun, Defa Zhu, Renda Bao, Wei Wang, Xiangbo Shu, and Shuicheng Yan. Face aging with contextual generative adversarial nets. In Proceedings of the 25th ACM international conference on Multimedia, pages 82-90, 2017.
[21] Yunfan Liu, Qi Li, and Zhenan Sun. Attribute-aware face aging with wavelet-based generative adversarial networks. In Proceedings of the IEEE Conference on Computer Vision and Pattern Recognition, pages 11877-11886, 2019.
[22] Mehdi Mirza and Simon Osindero. Conditional generative adversarial nets. arXiv preprint arXiv:1411.1784, 2014.
[23] Augustus Odena, Christopher Olah, and Jonathon Shlens. Conditional image synthesis with auxiliary classifier gans. In International conference on machine learning, pages 2642-2651, 2017.
[24] Roy Or-El, Soumyadip Sengupta, Ohad Fried, Eli Shechtman, and Ira Kemelmacher-Shlizerman. Lifespan age transformation synthesis. In Proceedings of the European Conference on Computer Vision (ECCV), 2020.
[25] Hongyu Pan, Hu Han, Shiguang Shan, and Xilin Chen. Mean-variance loss for deep age estimation from a face. In Proceedings of the IEEE Conference on Computer Vision and Pattern Recognition, pages 5285-5294, 2018.
[26] Taesung Park, Ming-Yu Liu, Ting-Chun Wang, and Jun-Yan Zhu. Gaugan: semantic image synthesis with spatially adaptive normalization. In ACM SIGGRAPH 2019 Real-Time Live! 2019.
[27] Narayanan Ramanathan and Rama Chellappa. Modeling age progression in young faces. In 2006 IEEE Computer Society Conference on Computer Vision and Pattern Recognition (CVPR'06), volume 1, pages 387-394. IEEE, 2006.

[28] Narayanan Ramanathan and Rama Chellappa. Modeling shape and textural variations in aging faces. In 2008 8$^{th}$ IEEE International Conference on Automatic Face & Gesture Recognition, pages 1-8. IEEE, 2008.

[29] Karl Ricanek and Tamirat Tesafaye. Morph: A longitudinal image database of normal adult age-progression. In 7$^{th}$ International Conference on Automatic Face and Gesture Recognition (FGR06), pages 341-345. IEEE, 2006.

[30] Rasmus Rothe, Radu Timofte, and Luc Van Gool. Dex: Deep expectation of apparent age from a single image. In Proceedings of the IEEE international conference on computer vision workshops, pages 10-15, 2015.

[31] Duncan A Rowland and David I Perrett. Manipulating facial appearance through shape and color. IEEE computer graphics and applications, 15(5):70-76, 1995.

[32] Yujun Shen, Jinjin Gu, Xiaoou Tang, and Bolei Zhou. Interpreting the latent space of gans for semantic face editing. In Proceedings of the IEEE/CVF Conference on Computer Vision and Pattern Recognition, pages 9243-9252, 2020.

[33] Xiangbo Shu, Jinhui Tang, Hanjiang Lai, Luoqi Liu, and Shuicheng Yan. Personalized age progression with aging dictionary. In Proceedings of the IEEE international conference on computer vision, pages 3970-3978, 2015.

[34] Jinli Suo, Xilin Chen, Shiguang Shan, Wen Gao, and Qionghai Dai. A concatenational graph evolution aging model. IEEE transactions on pattern analysis and machine intelligence, 34(11):2083-2096, 2012.

[35] Jinli Suo, Feng Min, Songchun Zhu, Shiguang Shan, and Xilin Chen. A multi-resolution dynamic model for face aging simulation. In 2007 IEEE Conference on Computer Vision and Pattern Recognition, pages 1-8. IEEE, 2007.

[36] Jinli Suo, Song-Chun Zhu, Shiguang Shan, and Xilin Chen. A compositional and dynamic model for face aging. IEEE Transactions on Pattern Analysis and Machine Intelligence, 32(3):385-401, 2009.

[37] Bernard Tiddeman, Michael Burt, and David Perrett. Prototyping and transforming facial textures for perception research. IEEE computer graphics and applications, 21(5):42-50, 2001.

[38] James T Todd, Leonard S Mark, Robert E Shaw, and John B Pittenger. The perception of human growth. Scientific American, 242(2):132-145, 1980.

[39] Wei Wang, Zhen Cui, Yan Yan, Jiashi Feng, Shuicheng Yan, Xiangbo Shu, and Nicu Sebe. Recurrent face aging. In Proceedings of the IEEE Conference on Computer Vision and Pattern Recognition, pages 2378-2386, 2016.

[40] Wei Wang, Yan Yan, Stefan Winkler, and Nicu Sebe. Category specific dictionary learning for attribute specific feature selection. IEEE Transactions on Image Processing, 25(3):1465-1478, 2016.

[41] Zongwei Wang, Xu Tang, Weixin Luo, and Shenghua Gao. Face aging with identity-preserved conditional generative adversarial networks. In Proceedings of the IEEE conference on computer vision and pattern recognition, pages 7939-7947, 2018.

[42] Yin Wu, Nadia Magnenat Thalmann, and Daniel Thalmann. A plastic-visco-elastic model for wrinkles in facial animation and skin aging. In Fundamentals of Computer Graphics, pages 201-213. World Scientific, 1994.

[43] Hongyu Yang, Di Huang, Yunhong Wang, and Anil K Jain. Learning face age progression: A pyramid architecture of gans. In Proceedings of the IEEE conference on computer vision and pattern recognition, pages 31-39, 2018.

[44] Hongyu Yang, Di Huang, Yunhong Wang, Heng Wang, and Yuanyan Tang. Face aging effect simulation using hidden factor analysis joint sparse representation. IEEE Transactions on Image Processing, 25(6):2493-2507, 2016.

[45] Xu Yao, Gilles Puy, Alasdair Newson, Yann Gousseau, and Pierre Hellier. High resolution face age editing. arXiv preprint arXiv:2005.04410, 2020.

[46] Zhifei Zhang, Yang Song, and Hairong Qi. Age progression/regression by conditional adversarial autoencoder. In Proceedings of the IEEE conference on computer vision and pattern recognition, pages 5810-5818, 2017.

[47] Jun-Yan Zhu, Taesung Park, Phillip Isola, and Alexei A Efros. Unpaired image-to-image translation using cycle-consistent adversarial networks. In Proceedings of the IEEE international conference on computer vision, pages 2223-2232, 2017.

What is claimed is:

1. A method comprising:
providing a unified age simulation model to generate, from an input image of a subject, a new image at a target age for the subject;
wherein the unified age simulation model provides a plurality of respective model-estimated age embeddings at each of a plurality of continuous ages representing continuous aging information, the model-estimated age embeddings learned through joint training of a generator and an age estimator embedded into an encoder-decoder architecture of the model, the age estimator configured to determine model-estimated ages of subjects from respective encoder generated features responsive to respective input images; and
wherein the generator generates the new image using the encoder generated features from the input image as transformed by respective ones of the model-estimated age embeddings determined in accordance with the target age and a model-estimated age of the subject.

2. The method of claim 1, wherein the encoder-decoder architecture comprises the age estimator to estimate a model-estimated age of the subject in the input image.

3. The method of claim 2, wherein an encoder of the model processes the input image to determine the encoder generated features and wherein the age estimator processes the encoder generated features to determine the model-estimated age.

4. The method of claim 2, wherein the encoder generated features are transformed by personalized age embeddings comprising:
  a. respective ones of the model-estimated age embeddings determined in accordance with the model-estimated age; and
  b. the respective ones of the model-estimated age embeddings determined in accordance with the target age.

5. The method of claim 4, wherein the personalized age embeddings comprise:
  a. personalized residual age embeddings determined from the plurality of respective model-estimated age embeddings in response to the model-estimated age to preserve identity information of the subject; and
  b. exemplary age embeddings comprising the respective ones of the model-estimated age embeddings determined in accordance with the target age to represent shared aging patterns among an entire population.

6. The method of claim 1 comprising providing a recommendation interface to obtain a recommendation for one or both of a product and a service.

7. The method of claim 1 comprising providing an ecommerce purchase interface to purchase one or both of products and services.

8. The method of claim 1 comprising receiving the input image and providing the new image for display, wherein each of the input image and the new image comprises a face of the subject.

9. A method comprising:
providing a unified model to generate, from an input image of a subject, a new image at a target class of a continuous effect for the subject;
wherein the model provides a plurality of respective model-estimated class embeddings at each of a plurality of continuous classes representing continuous effect information, the model-estimated class embeddings learned through joint training of a generator and an class estimator embedded into an encoder-decoder architecture of the model, the class estimator configured to determine model-estimated classes of respective subjects from respective encoder generated features responsive to respective input images; and
wherein the generator generates the new image using the encoder generated features from the input image as transformed by respective ones of the model-estimated class embeddings determined in accordance with the target class and a model-estimated class of the subject.

10. A method comprising:
providing a domain transfer model to transfer an input image to a new image, applying a continuous effect to transform the input to a target class of a plurality of continuous classes of the continuous effect using a plurality of respective model-estimated class embeddings learned by the model for each of the classes; and
transferring the input image to the new image using the domain transfer model.

11. The method of claim 10, wherein the progressive effect comprises an aging effect, the plurality of respective model-estimated class embeddings comprise respective model-estimated age embeddings and the target class comprises a target age.

12. The method of claim 11, wherein, when transferring the input image, the domain transfer model operates to:
produce encoded features of the input image;
transform the encoded features using:
personalized residual age embeddings determined from the plurality of respective model-estimated age embeddings in response to a model-estimated age of a subject in the input image to preserve identity information of the subject; and
exemplary age embeddings comprising respective ones of the model-estimated residual age embeddings determined in accordance with the target age to represent shared aging patterns among an entire population; and
generate the new image using the encoded features as transformed.

13. The method of claim 12, wherein the model comprises an age estimator to determine the model-estimated age.

14. The method of claim 13, wherein the age estimator comprises a classifier trained together with an encoder, the encoder configured for producing the encoded features, and wherein the age estimator is trained to determine respective model-estimated ages of subjects in new images using respective encoded features encoded by the encoder.

15. The method of claim 14, wherein the model-estimated age embeddings are defined during the training of the age estimator together with the encoder, associating respective ones of the model-estimated age embeddings with the respective model-estimated ages.

16. The method of claim 10 comprising providing a recommendation for at least one of a product and a service associated with the continuous effect.

17. The method of claim 16, wherein the recommendation is generated in response to one or both of: a skin analysis of the input image and a user input of preferences.

18. The method of claim 16, wherein the target age is determined in response to the recommendation.

19. The method of claim 16 comprising providing an annotated image generated from the input image to present the recommendation.

20. The method of claim 16 comprising providing an ecommerce interface to purchase products, services or both.

21. The method of claim 16, wherein: the continuous effect is an aging effect; the product comprises one of a rejuvenation product, an anti-aging product, and a cosmetic make-up product; and the service comprises one of a rejuvenation service, an anti-aging service, and a cosmetic service.

* * * * *